United States Patent
Wang et al.

(10) Patent No.: US 11,927,672 B2
(45) Date of Patent: Mar. 12, 2024

(54) OBSTACLE DETECTION METHOD AND APPARATUS AND STORAGE MEDIUM

(71) Applicant: SUTENG INNOVATION TECHNOLOGY CO., LTD., Shenzhen (CN)

(72) Inventors: Bin Wang, Shenzhen (CN); Leilei Shinohara, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/116,245

(22) Filed: Mar. 1, 2023

(65) Prior Publication Data

US 2023/0204779 A1 Jun. 29, 2023

Related U.S. Application Data

(63) Continuation of application No. 17/835,907, filed on Jun. 8, 2022, now Pat. No. 11,624,831.

(30) Foreign Application Priority Data

Jun. 9, 2021 (CN) .......................... 202110641220.2
Jun. 9, 2021 (CN) .......................... 202110641243.3

(51) Int. Cl.
*G01S 17/89* (2020.01)
*G01S 17/931* (2020.01)
*G06V 20/58* (2022.01)

(52) U.S. Cl.
CPC ............ *G01S 17/89* (2013.01); *G01S 17/931* (2020.01); *G06V 20/58* (2022.01)

(58) Field of Classification Search
CPC ........ G01S 17/89; G01S 17/931; G06V 20/58
See application file for complete search history.

(56) References Cited

U.S. PATENT DOCUMENTS 10,509,413 B2    12/2019  Mou
2020/0003897 A1*  1/2020  Shroff ................... G01S 17/931
(Continued)

FOREIGN PATENT DOCUMENTS

CN    1619511 A  *  5/2005   ......... G06F 12/0875
CN    101419667 A      4/2009
(Continued)

OTHER PUBLICATIONS

First Office Action issued in related Chinese Application No. 202110641243.3, dated Aug. 23, 2021, 12 pages.
(Continued)

*Primary Examiner* — Peter D Nolan
*Assistant Examiner* — Demetra R Smith-Stewart
(74) *Attorney, Agent, or Firm* — BAYES PLLC

(57) ABSTRACT

This application provides a data processing method and apparatus and a storage medium. The data processing method includes: obtaining K idle calculation blocks in real time, where K is greater than or equal to 1; invoking first K pieces of detected data from a cache stack in a preset priority sequence of detected data, and inputting the detected data into the K idle calculation blocks; sequentially processing K pieces of detected data on the K idle calculation blocks in the preset priority sequence; and integrating sensing calculation results of the K pieces of detected data in real time based on a boundary relationship between detection ranges of the K pieces of detected data, and outputting a sensing result.

9 Claims, 21 Drawing Sheets

(56) References Cited

U.S. PATENT DOCUMENTS

| | | | | |
|---|---|---|---|---|
| 2021/0279957 | A1* | 9/2021 | Eder | ............... G06Q 10/06395 |
| 2021/0405638 | A1 | 12/2021 | Boyraz et al. | |

FOREIGN PATENT DOCUMENTS

| CN | 101466041 A | 6/2009 |
|---|---|---|
| CN | 102841816 A | 12/2012 |
| CN | 104442757 A | 3/2015 |
| CN | 105701821 A * | 6/2016 |
| CN | 107463904 A | 12/2017 |
| CN | 107945198 A | 4/2018 |
| CN | 109684944 A | 4/2019 |
| CN | 110458055 A | 11/2019 |
| CN | 110599543 A | 12/2019 |
| CN | 111060911 A | 4/2020 |
| CN | 111273268 A | 6/2020 |
| CN | 111353512 A | 6/2020 |
| CN | 111353969 A | 6/2020 |
| CN | 111369590 A | 7/2020 |
| CN | 111415520 A | 7/2020 |
| CN | 111427355 A | 7/2020 |
| CN | 111469832 A | 7/2020 |
| CN | 111699407 A | 9/2020 |
| CN | 111932943 A | 11/2020 |
| CN | 112162930 A | 1/2021 |
| CN | 112163643 A | 1/2021 |
| CN | 112291024 A | 1/2021 |
| CN | 112327851 A | 2/2021 |
| CN | 112330746 A | 2/2021 |
| CN | 112498365 A | 3/2021 |
| CN | 112560689 A | 3/2021 |

OTHER PUBLICATIONS

Second Office Action issued in related Chinese Application No. 202110641243.3, dated Sep. 3, 2021, 16 pages.
Third Office Action issued in related Chinese Application No. 202110641243.3, dated Sep. 16, 2021, 5 pages.
First Office Action issued in related Chinese Application No. 202110641220.2, dated Aug. 23, 2021, 31 pages.

\* cited by examiner

OBSTACLE DETECTION METHOD AND APPARATUS AND STORAGE MEDIUM

CROSS-REFERENCE TO RELATED APPLICATION

The present application is a continuation of application Ser. No. 17/835,907, filed on Jun. 8, 2022, which claims the benefit of Chinese Patent Application No. 202110641243.3, filed on Jun. 9, 2021, and Chinese Patent Application No. 202110641220.2, filed on Jun. 9, 2021. The contents of each of the above-referenced applications are expressly incorporated herein by reference in their entireties.

TECHNICAL FIELD

This application relates to the technical field of smart driving, and in particular, to an obstacle detection method and apparatus and a storage medium.

BACKGROUND

In a technical field of artificial intelligence, target tracking is an important topic in an advanced driving assistant system (ADAS). Effectively improving real-time performance of target sensing can provide a driver with target object information more reliably in a more timely manner. With such information, safety performance of the ADAS can be further improved, to achieve a purpose of autonomous driving. However, currently, due to a limitation of a scanning method, a scanning cycle, and the like, it is difficult to improve real-time performance of LiDAR. Therefore, currently, how to improve the real-time performance and accuracy of target sensing is a problem that urgently needs to be resolved.

In addition, in a smart driving system, a sensing algorithm provides a function of "eyes" and serves as input of subsequent prediction and decision planning algorithms. The sensing algorithm is an important part of an autonomous driving system. In most existing sensing algorithms, better performance is achieved based on a deep learning technology. However, when image data is processed by using the deep learning technology, due to increasing resolution of an image, a video, or the like, calculation resources cannot be properly allocated, thereby making it difficult to improve real-time performance of data processing.

SUMMARY

Embodiments of this application provide an obstacle detection method and apparatus and a storage medium, which can effectively improve real-time performance of obstacle detection, irrespective of a scanning mode and a scanning cycle of a radar. In addition, embodiments of this application further provide a data processing method and apparatus and a storage medium, to improve real-time performance of data processing by properly allocating calculation resources.

To resolve the foregoing technical problems, this application includes the following technical solution:

According to a first aspect, an embodiment of this application provides an obstacle detection method, where the method includes:
    obtaining point cloud data in an $N^{th}$ detection sub-range of LiDAR in a preset sequence, wherein a detection range of the LiDAR in a detection cycle includes M detection sub-ranges, the $N^{th}$ detection sub-range is any one of the M detection sub-ranges, M is an integer greater than or equal to 2, and N is an integer less than or equal to M; and
    calculating confidence that the $N^{th}$ detection sub-range includes a preset target object based on the obtained point cloud data in the $N^{th}$ detection sub-range; and if the confidence is greater than or equal to a preset threshold, outputting an identification result of the preset target object.

According to a second aspect, an embodiment of this application provides an obstacle detection apparatus, where the apparatus includes:
    an obtaining module, configured to obtain point cloud data in an $N^{th}$ detection sub-range of LiDAR in a preset sequence, where a detection range of the LiDAR in a detection cycle includes M detection sub-ranges, the $N^{th}$ detection sub-range is any one of the M detection sub-ranges, M is an integer greater than or equal to 2, and N is an integer less than or equal to M; and
    a detection module, configured to: calculate confidence that the $N^{th}$ detection sub-range includes a preset target object based on the obtained point cloud data in the $N^{th}$ detection sub-range; and if the confidence is greater than or equal to a preset threshold, output an identification result of the preset target object.

According to a third aspect, an embodiment of this application provides another obstacle detection apparatus, where the obstacle detection apparatus includes a processor, a memory, and a communications interface;
    the processor is connected to the memory and the communications interface;
    the memory is configured to store executable program code; and
    the processor reads the executable program code stored in the memory to run a program corresponding to the executable program code, to perform the obstacle detection method according to any one of the first aspect.

According to a fourth aspect, an embodiment of this application provides a computer-readable storage medium, storing a computer program, where when the program is executed by a processor, the obstacle detection method according to any one of the first aspect is implemented.

According to a fifth aspect, an embodiment of this application provides a data processing method, where the method includes:
    obtaining a number K of idle calculation blocks in real time, where K is greater than or equal to 1;
    invoking first K pieces of detected data from a cache stack in a preset priority sequence of detected data, and inputting the detected data into the idle calculation block for sensing calculation; and
    integrating sensing calculation results of the K pieces of detected data in real time based on a boundary relationship between detection ranges of the K pieces of detected data, and outputting a sensing result.

According to a sixth aspect, an embodiment of this application provides a data processing apparatus, where the apparatus includes:
    a first obtaining module, configured to obtain a number K of idle calculation blocks in real time, where K is greater than or equal to 1;
    a calculation module, configured to: invoke first K pieces of detected data from a cache stack in a preset priority sequence of detected data, and input the detected data into the idle calculation block for sensing calculation; and an integration module, configured to: integrate sensing calculation results of the K pieces of detected data in real time based on a boundary relationship between detection ranges of the K pieces of detected data, and output a sensing result.

According to a seventh aspect, an embodiment of this application provides a data processing apparatus, including a processor, a memory, and a communications interface, where the processor is connected to the memory and the communications interface;

the memory is configured to store executable program code; and the processor reads the executable program code stored in the memory to run a program corresponding to the executable program code, to perform the data processing method according to the first aspect.

According to an eighth aspect, an embodiment of this application provides a computer-readable storage medium, storing a computer program, where when the program is executed by a processor, the data processing method according to the first aspect is implemented.

In the obstacle detection method provided in this application, by changing an output mode of the LiDAR, the detection range of the LiDAR is divided into multiple sub-ranges, and the multiple sub-ranges are detected in the preset sequence, confidence of the multiple sub-ranges is obtained and accumulated in real time, and the detection result of the obstacle is output when the detected confidence exceeds the preset confidence. In the obstacle detection method provided in this application, the detection cycle is divided, to shorten detection time of each subunit, thereby improving the real-time performance of obstacle detection.

In addition, in the data processing method provided in this application, the entire data frame within the detection range of the sensor is divided, the divided detected data is calculated in the preset priority sequence, and after calculation, the divided detected data is sent to the integration module for integration, and finally the data processing result is output. In the data processing method provided in this application, the entire data frame is divided, to shorten detection time of each piece of divided detected data, thereby improving the real-time performance of performing sensing calculation on the data.

BRIEF DESCRIPTION OF DRAWINGS

To explain embodiments of the present application or the technical solutions in the prior art more clearly, the following briefly introduces the drawings that need to be used in the embodiments or the prior art. Obviously, the drawings in the following description are only some embodiments of the present application. The person skilled in the art may obtain other drawings based on these drawings without creative efforts.

DETAILED DESCRIPTION

To make the foregoing objectives, characteristics, and advantages of this application more clearly and understandable, the following describes specific embodiments of this application in detail with reference to the accompanying drawings.

Terms "first," "second," "third," and the like in this specification and claims of this application and the foregoing drawings are used to distinguish different objects, instead of describing a specific sequence. In addition, terms "include," "have," and any variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
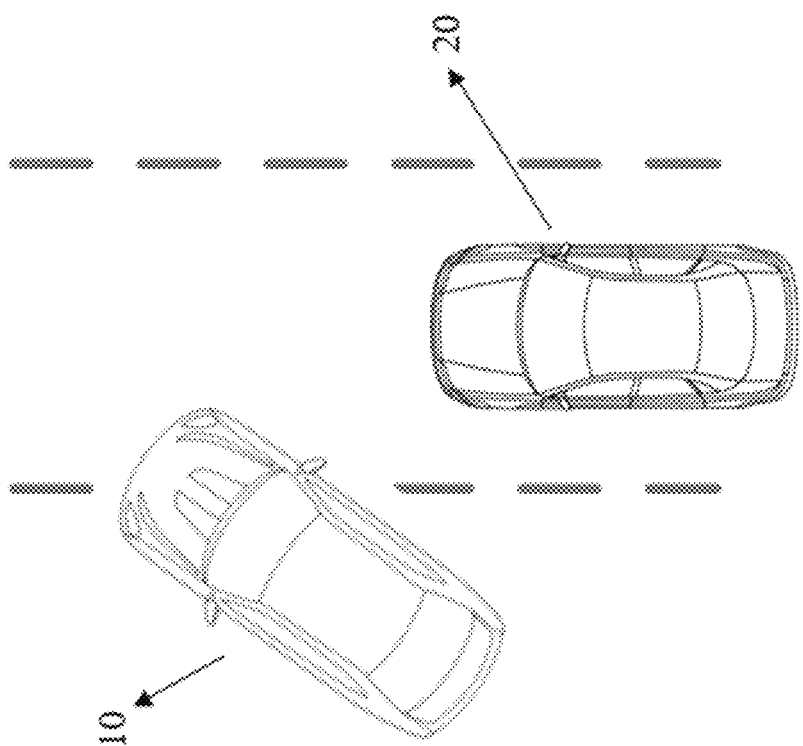
FIG. 1 is a schematic diagram of an obstacle detection scenario according to an embodiment of this application.
Figure 2:
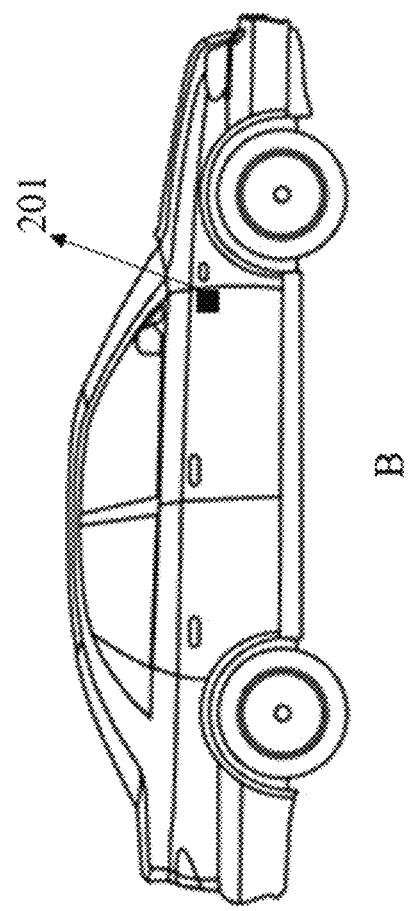
FIG. 2 is a schematic diagram of a mounting position of LiDAR according to an embodiment of this application.
Figure 2:
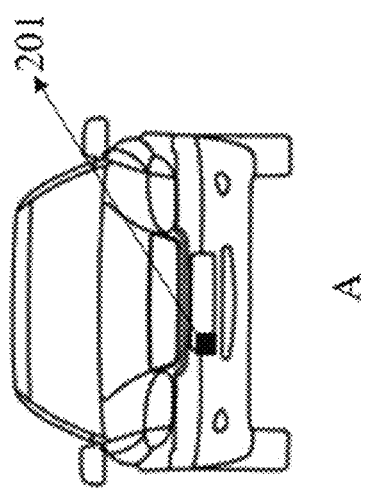

Referring to FIG. 1 and FIG. 2, FIG. 1 is a schematic diagram of an obstacle detection scenario according to an embodiment of this application. The schematic diagram of the obstacle detection scenario includes an obstacle 10 and a vehicle 20. The vehicle 20 is mounted with LiDAR 201. As shown in FIG. 2, FIG. 2 is a schematic diagram of a mounting position of LiDAR according to an embodiment of this application.

The obstacle 10 may include, but is not limited to, a pedestrian, a vehicle, an animal, a tree, a building, an object moving at a speed, or the like that hinders the normal driving of the vehicle. In this embodiment of this application, the LiDAR 201 can detect the obstacle 10 and obtain a detection result, and the detection result of the obstacle is finally displayed on a vehicle-mounted terminal. Herein, detection results of the obstacle 10 may include, but are not limited to, point cloud data of the obstacle 10, an obstacle type identification result, speed information, distance information, warning prompt image or sound information, and the like.

The vehicle 20 can include a car, a bus, a semi-trailer, an off-road vehicle, a dedicated vehicle, a truck, a tractor, a dump truck, or any other type of vehicle. A series, a type, or a model of the vehicle 20 is not limited herein. In this embodiment of this application, the vehicle can travel on a road such as a crossing, an intersection, or an expressway without affecting traffic. The vehicle 20 can detect an obstacle within a preset range through the LiDAR 201, and display the detection result on the vehicle-mounted terminal.

The LiDAR 201 can include solid-state LiDAR of a micro-electro-mechanical system (Micro-Electro-Mechanical System, MEMS), rotary mechanical scanning LiDAR, or another type of LiDAR. In this embodiment of this application, an automated driving sensing system may include one LiDAR 201. Herein, as shown in FIG. 2, when collecting point cloud data, the LiDAR 201 may be mounted at a position shown in sub-figure A. It can be understood that the LiDAR 201 can also be mounted at a position shown in sub-figure B. This embodiment of this application imposes no limitation on a specific mounting position of the LiDAR 201. It can be understood that, in this embodiment of this application, as shown in FIG. 2, the automated driving sensing system may also include multiple LiDARs. Herein, when the automated driving sensing system includes the multiple LiDARs, the number of radars included in the automated driving sensing system is not specifically limited. The LiDAR 201 may be any radar in the automated driving sensing system, and this application imposes no limitation on a specific composition form of the automated driving sensing system.

Next, the obstacle detection method provided in this embodiment of this application is described with reference to the schematic diagram of the obstacle detection scenario and the schematic diagram of LiDAR mounting shown in FIG. 1 and FIG. 2.

Figure 3:
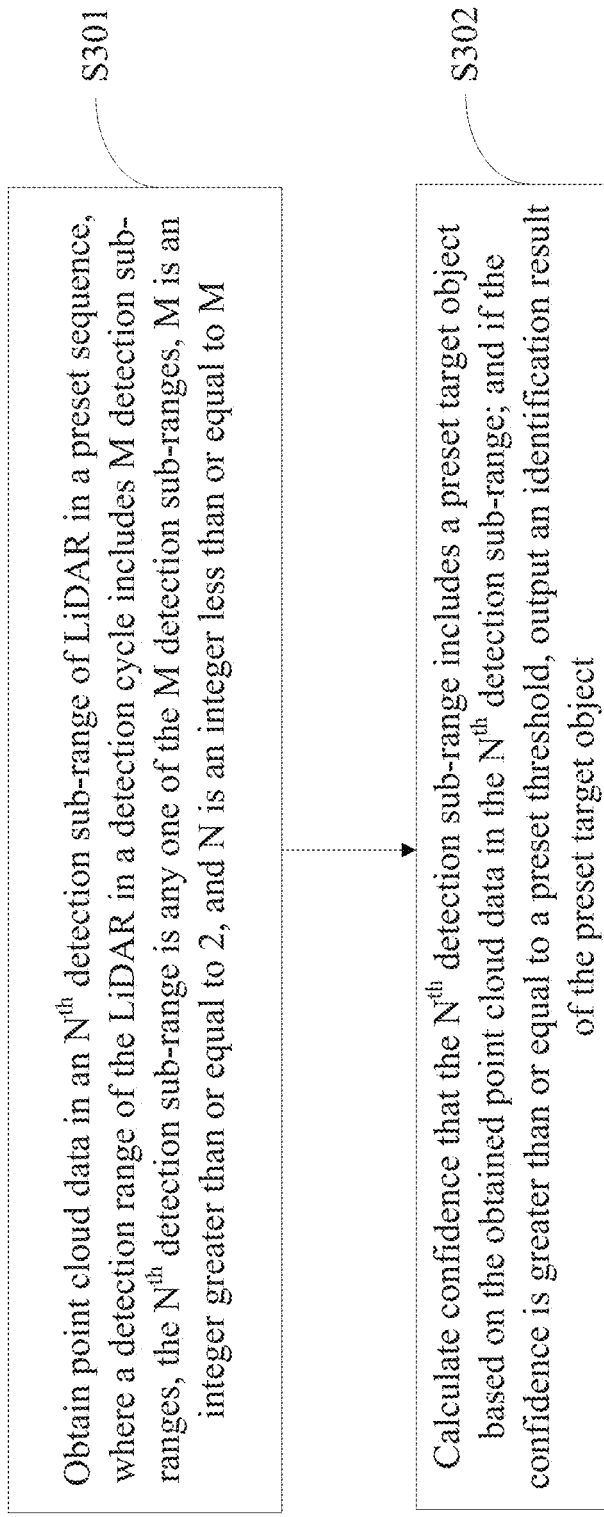
FIG. 3 is a schematic flowchart of an obstacle detection method according to an embodiment of this application.

Referring to FIG. 3, FIG. 3 is a schematic flowchart of an obstacle detection method according to an embodiment of this application. The method includes:

S301. Obtain point cloud data in an $N^{th}$ detection sub-range of LiDAR in a preset sequence, where a detection range of the LiDAR in a detection cycle includes M detection sub-ranges, the $N^{th}$ detection sub-range is any one of the M detection sub-ranges, M is an integer greater than or equal to 2, and N is an integer less than or equal to M.

Herein, the preset sequence may be a scanning sequence of the LiDAR.

Specifically, different types of LiDAR use different methods for scanning point cloud data. MEMS LiDAR performs scanning through a simple harmonic motion of a scanning mirror, and therefore, an optical scanning path can implement, for example, a scanning field of view with a reciprocating motion from top to bottom on a slow axis and a reciprocating motion from left to right on a fast axis in a spatial sequence. For another example, mechanical LiDAR performs scanning by driving an optical system to rotate 360 degrees through a mechanical drive device, to form a cylindrical detection region with the LiDAR as the center. Different LiDARs obtain point cloud data in the $N^{th}$ detection sub-range of the LiDAR in the preset sequence, and a detection range of one detection cycle of the LiDAR includes the M detection sub-ranges. Herein, the $N^{th}$ detection sub-range is any one of the M detection sub-ranges, M is an integer greater than or equal to 2, and N is an integer less than or equal to M.

Further, before the LiDAR obtains the point cloud data in the $N^{th}$ detection sub-range of the LiDAR in the preset sequence, the method further includes: determining a dividing method for the M detection sub-ranges, wherein the dividing method includes: performing division based on detection time corresponding to one detection cycle of the LiDAR, or performing division based on a detection range corresponding to one detection cycle of the LiDAR.

When division is performed based on the detection time corresponding to the detection cycle of the LiDAR, before the point cloud data in the $N^{th}$ detection sub-range of the LiDAR is obtained in the preset sequence, the method further includes: obtaining the detection time corresponding to the detection cycle of the LiDAR, and dividing the detection cycle into M detection sub-cycles based on a preset rule. It can be understood that a detection range corresponding to each sub-cycle is a detection sub-range, and the detection cycle is detection time of one data frame. Obtaining the point cloud data in the $N^{th}$ detection sub-range of the LiDAR in the preset sequence includes: based on the detection time corresponding to the detection cycle of the LiDAR, determining detection time corresponding to each one of the M detection sub-ranges; obtaining first detection time corresponding to the $N^{th}$ detection sub-range; and when the LiDAR runs at the first detection time, obtaining the point cloud data corresponding to the $N^{th}$ detection sub-range in a scanning sequence of the LiDAR. Herein, the preset rule can be a customized rule, for example, an equal dividing rule. That is, the detection cycle can be divided into M equal parts. If the detection cycle of the LiDAR is T, each time the LiDAR runs for time of T/M, point cloud data obtained by the LiDAR through scanning within the time of T/M is obtained. It can be understood that the preset rule can also be an arrangement in a gradual descending sequence of time lengths. For example, if an operating cycle of the mechanical LiDAR is 100 ms, when M is 5, operating time corresponding to the 5 detection sub-ranges may be, for example, 30, 25, 20, 15, and 10 in sequence. It can be understood that the preset rule can also be an arrangement in a gradual ascending sequence of time lengths. For example, if an operating cycle of the mechanical LiDAR is 100 ms, when M is 5, operating time corresponding to the 5 detection sub-ranges may be, for example, 10, 15, 20, 25, and 30 in sequence.

When division is performed based on the detection range corresponding to the detection cycle of the LiDAR, before the point cloud data in the $N^{th}$ detection sub-range of the LiDAR is obtained in the preset sequence, the method further includes: obtaining the detection range corresponding to the detection cycle of the LiDAR, and dividing the detection range into M detection sub-ranges based on a preset rule. Obtaining the point cloud data in the $N^{th}$ detection sub-range of the LiDAR in the preset sequence includes: based on the detection range corresponding to the detection cycle of the LiDAR, determining a detection range corresponding to each one of the M detection sub-ranges; obtaining a first detection range corresponding to the $N^{th}$ detection sub-range; and when the LiDAR scans in the first detection range, obtaining the point cloud data corresponding to the $N^{th}$ detection sub-range in a scanning sequence of the LiDAR. The preset rule can include the equal dividing rule. It can be understood that the preset rule can also be arrangement in an ascending sequence of detection range sizes. This application imposes no specific limitation on the preset rule.

Figure 4:
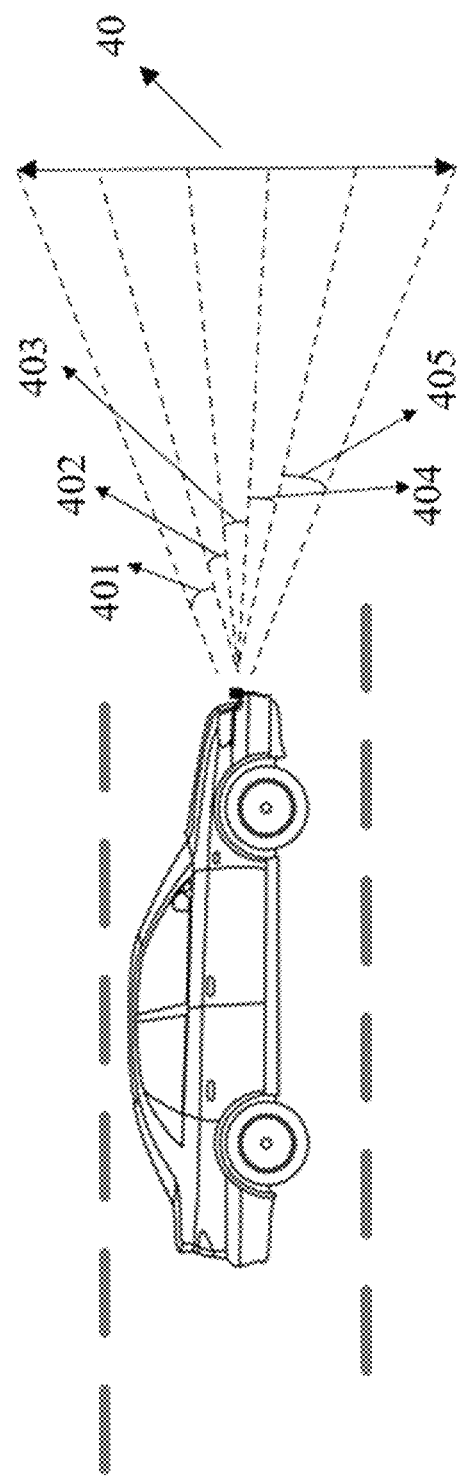
FIG. 4 is a schematic diagram of application of solid-state LiDAR according to an embodiment of this application.

Referring to the schematic diagram shown in FIG. 4, a vehicle shown in FIG. 4 is mounted with a MEMS solid-state LiDAR. When the MEMS LiDAR performs division, because the MEMS LiDAR makes a reciprocating movement on a fast axis from a first direction to a second direction and a linear movement on a slow axis from the first direction to the second direction in one cycle, the detection range is divided based on a detection field of view of the slow axis. The LiDAR usually uses a reciprocating scanning mode from top to bottom or from bottom to top. When being divided, the detection range of the LiDAR is usually divided based on the detection angle of view of the slow axis. That is, the vertical angle of view is divided. Referring to 40 in FIG. 4, 40 represents the vertical angle of view corresponding to the slow axis of the MEMS LiDAR. If the vertical angle of view is from −12.5° to 12.5°, assuming that M is equal to 5, a detection sub-range is formed each time the MEMS LiDAR scans 5° on the slow axis. That is, an angle corresponding to a detection sub-range 401, 402, 403, 404, or 405 in FIG. 4 is 5°.

Figure 5:
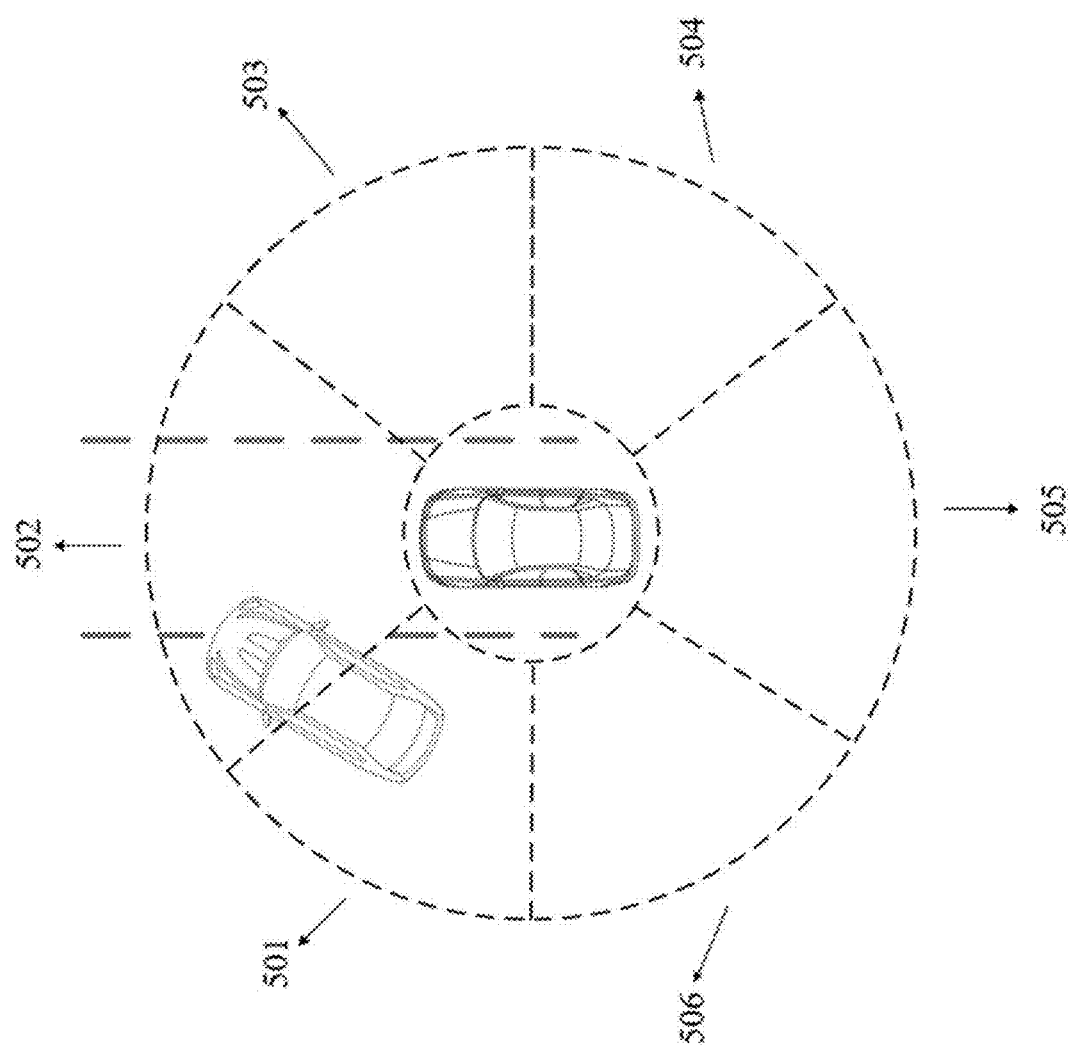
FIG. 5 is a schematic diagram of application of rotary mechanical LiDAR according to an embodiment of this application.

Referring to the schematic diagram shown in FIG. 5, a vehicle shown in FIG. 5 is mounted with a rotary mechanical scanning LiDAR. The rotary mechanical LiDAR usually transmits or receives information on several paths in a vertical direction, and simultaneously rotates and scans in a horizontal direction to form several parallel paths. For the mechanical LiDAR, a detection angle corresponding to a detection range of the mechanical LiDAR after rotation for one cycle is usually divided. If a detection range of LiDAR of this model is 360°, based on the equal dividing rule, each time the mechanical LiDAR rotates 60°, a detection sub-range is formed. That is, each time the LiDAR rotates 60°, point cloud data in a detection sub-range can be obtained. As shown in FIG. 5, the detection range of the LiDAR can be set as 6 detection sub-ranges 501, 502, 503, 504, 505, and 506 shown in the figure. In this case, a detection angle corresponding to each detection sub-range is 60°.

It can be understood that before the point cloud data in the Nib detection sub-range of the LiDAR is obtained in the preset sequence, the method further includes: obtaining ambient information of the LiDAR; based on the ambient information, determining a scenario in which the LiDAR is located; and adjusting the number M of detection sub-ranges included in the detection range within the detection cycle of the LiDAR based on the scenario. The ambient information may include number information of traffic lights, intersection information, crosswalk information and number information of pedestrians, lane line information, toll booth information, and the like. This application imposes no limitation on content included in the ambient information. It can be understood that the scenario includes an intersection scenario, a highway scenario, an urban road scenario, or the like. It can be understood that the intersection scenario has a highest real-time performance requirement for a target detection region, and therefore, the number M of divided detection sub-ranges is the maximum in the intersection scenario, followed by the urban road scenario and then the highway scenario. It can be understood that when the LiDAR obtains point cloud information, a scenario in which the LiDAR is located can be determined based on characteristic information extracted from the point cloud information, and the number M of detection sub-ranges included in the detection range of the LiDAR in one detection cycle can be adjusted based on the scenario.

It can be understood that adjusting the number M of detection sub-ranges corresponding to the detection cycle of the LiDAR may further include: determining scenario complexity of the scenario in which the LiDAR is located; judging whether the scenario complexity is greater than a preset threshold; and when the scenario complexity is greater than the preset threshold, based on a value of the scenario complexity, adjusting the number M of the detection sub-ranges corresponding to the detection cycle of the LiDAR. It can be understood that after obtaining the point cloud information, the LiDAR can judge, based on the number of obstacles, position(s) of the obstacles, speed information of the obstacles, and the like identified in the point cloud information, the complexity of the scenario in which the LiDAR is located, and adjust the number M of detection sub-ranges included in the detection range of the LiDAR in one detection cycle based on the scenario complexity.

It can be understood that the LiDAR can adjust the number M of detection sub-ranges based on a change in the scenario, a change in the scenario complexity in the scenario, and a change in both the scenario and the scenario complexity, to improve flexibility of detecting the obstacles, thereby further ensuring real-time performance and accuracy of obstacle detection. This application imposes no limitation on a sequence of determining the scenario and the scenario complexity, and imposes no limitation on whether to use the scenario and the scenario complexity separately or in combination to determine whether to adjust the number M of detection sub-ranges corresponding to one detection cycle.

It can be understood that the greater the scenario complexity is, the higher the real-time performance requirement for the target detection region is, and the greater the number of divided detection sub-ranges in the preset rule is.

Specifically, when the scenario complexity within the detection range characterized by the ambient information is greater than the preset threshold, the number M of detection sub-ranges is adjusted to P, and a post-adjustment detection sub-range is smaller than a pre-adjustment detection sub-range. Herein, P is a positive integer greater than M. In actual application, when it is detected that the scenario complexity exceeds the preset threshold, it indicates that the current driving environment is relatively complex, which can be manifested as more pedestrians, vehicles, and the like, and affect current normal driving of a user to some extent. In this case, each detection sub-range is reduced to fine divide the detection sub-range, to help calculate and analyze the point cloud data in a more timely manner, thereby improving the real-time performance and accuracy of obstacle detection and improving safety of the user's driving. When the scenario complexity within the detection range characterized by the ambient information is less than the preset threshold, the number of detection sub-ranges is adjusted from M to K, and a post-adjustment detection sub-range is greater than a pre-adjustment detection sub-range. When the scenario complexity is less than the preset threshold, it indicates that a current driving environment is relatively simple, which can be specifically manifested as fewer pedestrians, fewer vehicles, and the like. In this case, increasing each detection sub-range can reduce power consumption of devices such as the LiDAR and a vehicle-mounted terminal, thereby improving user experience. K is a positive integer less than M. The preset threshold of the scenario complexity can be set manually. For example, using 0 to 1 to represent the complexity, the preset threshold is set to 0.6. That is, when the scenario complexity is greater than 0.6, the number of detection sub-ranges is adjusted from M to P. It should be noted that this application imposes no limitation on how the ambient information characterizes the scenario complexity within the detection range of the LiDAR.

In an optional method, the LiDAR may further divide the detection range within the detection cycle into a common detection range and a target detection range. The target detection range is a key detection region preset by the user, that is, a ROI region. The target detection region can be preset by the user.

Optionally, before the M detection sub-ranges of the LiDAR are obtained in a preset sequence, the method further includes: determining a common detection range and a target detection range within the detection range of the LiDAR; determining a preset dividing rule for the M detection sub-ranges based on the common detection range and the target detection range; and dividing the detection range within the detection cycle into the M detection sub-ranges based on the preset rule.

Determining a preset dividing rule for the M detection sub-ranges based on the common detection range and the target detection range includes: determining a first preset dividing rule for the common detection range and a second dividing rule for the target detection range; and dividing the common detection range into "a" detection sub-ranges based on the first dividing rule, and dividing the target detection range into "b" detection sub-ranges based on the second dividing rule, where a+b=m, and a<b.

It can be understood that a detection real-time performance requirement is higher within the target detection range, and therefore, a detection region within the target detection range is divided more finely, and the number of divided detection sub-ranges in the target detection range is greater. In general, each detection sub-range in the target detection range is smaller than each detection sub-range in the common detection range.

It should be noted that, in this embodiment of this application, in a process of dividing the detection range of the LiDAR, any detection sub-range can also be overlapped with two adjacent detection sub-ranges in the preset detection sequence. Taking division of the detection range corresponding to the detection cycle of the LiDAR as an example, in a case of overlapping, a detection angle corresponding to each detection sub-range is larger than a corresponding detection angle in a case of non-overlapping. In this application, if adjacent detection sub-ranges have an overlapped part, a dividing method and an overlapped angle of the overlapped part are not limited.

Figure 6:
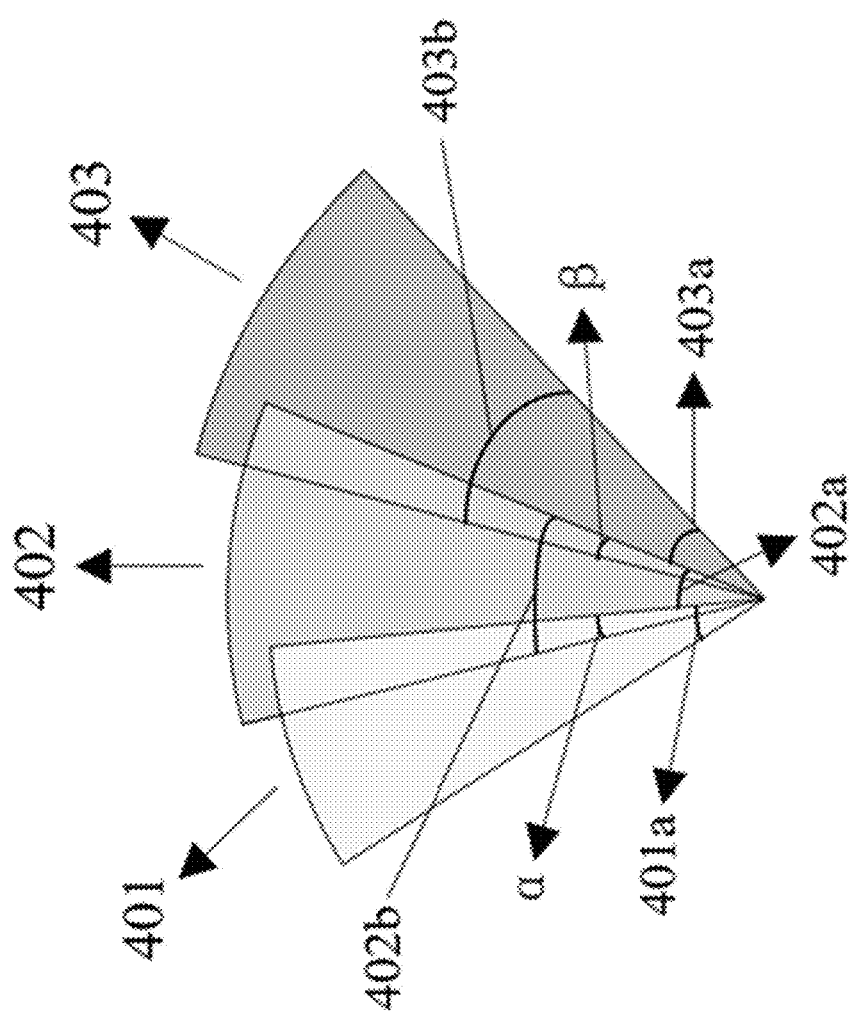
FIG. 6 is a schematic diagram of point cloud data detected when there is an overlapped part between detection sub-ranges according to an embodiment of this application.

Referring to the schematic diagram shown in FIG. 6, taking the MEMS solid-state LiDAR shown in FIG. 4 as an example, a detection range of the solid-state LiDAR includes detection sub-ranges. FIG. 6 shows detection regions respectively corresponding to detection sub-ranges 401, 402, and 403 when the detection sub-ranges are overlapped. In a case of non-overlapping and equal division of angles, detection angles respectively corresponding to the detection sub-ranges 401, 402, and 403 are all 5°. For example, angles 401*a*, 402*a*, and 403*a* in FIG. 6 are all 5°. In a case of overlapping and equal division of angles, an overlapped part of any detection sub-range is set as one fifth of an angle corresponding to a previous detection sub-range in the preset sequence. Taking the detection sub-range 402 as an example, in a case of an overlapped part, an overlapped part of the detection sub-range 402 is one fifth of the detection sub-range 401 adjacent to an edge of the detection sub-range 402, for example, a in FIG. 6. In this embodiment, α is equal to 1°. Therefore, in the case of the overlapped part, the detection angle α corresponding to the detection sub-range 402 plus the angle 402*a* is the angle 402*b* in FIG. 6, and the angle 402*b* is 6°. Likewise, the detection angle β corresponding to the detection sub-range 403 plus the angle 403*a* is the angle 403*b* in FIG. 6, and the angle 403*b* is 6°. For the detection sub-range 401, because the detection sub-range 401 is at a boundary of the detection range of the LiDAR, a detection range of the detection sub-range 401 may remain an original detection range, or may overlap the detection sub-range 402 based on a preset condition. This is not limited in this application. It can be understood that the overlapped region is disposed between two adjacent detection sub-ranges of the detection sub-ranges and in the preset detection sequence, so that identification confidence of objects in left and right boundary regions of the detection sub-range can be effectively improved, thereby outputting an identification result and further improving detection real-time performance of the target object.

S302. Calculate confidence that the $N^{th}$ detection sub-range includes a preset target object based on the obtained point cloud data in the $N^{th}$ detection sub-range; and if the confidence is greater than or equal to a preset threshold, output an identification result of the preset target object.

The preset target object may be a pedestrian, a vehicle, an animal, a tree, a building, another object moving at a speed, or the like that hinders the normal driving of the vehicle. This application imposes no limitation on a specific type of the preset target object.

Specifically, after obtaining the point cloud data in the $N^{th}$ detection sub-range, the LiDAR detects the point cloud data in the $N^{th}$ detection sub-range, calculates confidence of a preset target object included in the point cloud data in the detection sub-range, and outputs an identification result of the preset target object when the confidence exceeds the preset threshold. The identification result of the obstacle may be presented in forms including, but not limited to, point cloud data of the obstacle, an obstacle classification result, speed information, distance information, warning prompt image or sound information, and the like.

Further, if the LiDAR detects that the confidence that the $N^{th}$ detection sub-range includes the preset target object is less than the preset threshold, point cloud data in an $(N+1)^{th}$ detection sub-range is obtained, point cloud data in the two detection sub-ranges is integrated, and confidence that the two detection sub-ranges include the preset target object is calculated; and if the confidence is greater than or equal to the preset threshold, the identification result of the obstacle is output; or if the confidence is less than the preset threshold, point cloud data in an $(N+2)^{th}$ detection sub-range is continuously obtained, the point cloud data in the $(N+2)^{th}$ detection sub-range is integrated with the point cloud data in the $N^{th}$ detection sub-range and the $(N+1)^{th}$ detection sub-range, and confidence that the multiple integrated detection sub-ranges include the preset target object is calculated based on integrated point cloud data, where N+2≤M. For example, if confidence of a preset target object detected in a first detection sub-range, a second detection sub-range, . . . , an $(M-1)^{th}$ detection sub-range does not reach the preset threshold, a detection result may be output after one data frame is scanned.

Figure 7:
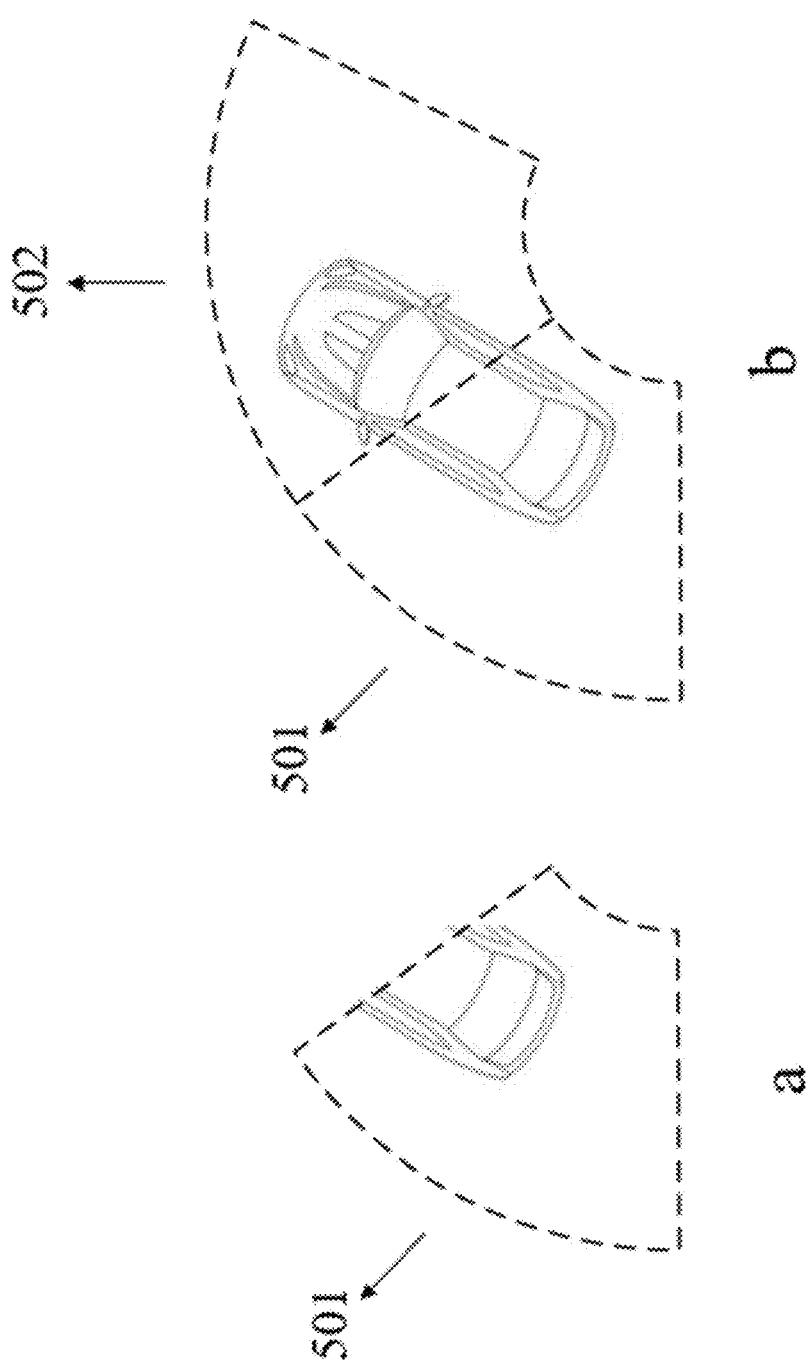
FIG. 7 is a schematic diagram of scanning point cloud data by solid-state LiDAR during obstacle detection according to an embodiment of this application.

Referring to a schematic diagram shown in FIG. 7, taking mechanical LiDAR as an example, a detection range of the mechanical LiDAR includes 6 detection sub-ranges in FIG. 4, which are detection sub-ranges 501, 502, 503, 504, and 505 arranged in a chronological sequence respectively. A preset confidence threshold of LiDAR is set to 0.7. As indicated by sub-figure a shown in FIG. 7, the LiDAR first obtains point cloud data of the detection sub-range 501 and detects that confidence of the detection sub-range 501 is 0.4. In this case, the confidence of the detection sub-range 501 does not exceed the preset confidence threshold of 0.7, point cloud data of the detection sub-range 502 is further integrated with the point cloud data of the detection sub-range 501, to obtain integrated point cloud data indicated by b shown in FIG. 7, and the integrated point cloud data is detected. Confidence of the integrated point cloud data indicated by sub-figure b shown in FIG. 7 is 0.9. In this case, the detected confidence of 0.9 exceeds the preset confidence threshold of 0.7, and therefore, a detection result of the obstacle can be output and displayed on a screen of the vehicle-mounted terminal in a manner of the point cloud data of the obstacle or obstacle prompt information. In this embodiment, the obstacle is determined as the vehicle based on the point cloud data, and therefore, the detected point cloud data of the vehicle or vehicle prompt information can be output and displayed on the vehicle-mounted terminal. Herein, detection results of the obstacle may include, but are not limited to, point cloud data of the obstacle 10, an obstacle type identification result, speed information, distance information, warning prompt image or sound information, and the like.

Further, calculating the confidence that the $N^{th}$ detection sub-range includes a preset target object based on the obtained point cloud data in the $N^{th}$ detection sub-range includes: clustering the obtained point cloud data in the $N^{th}$ detection sub-range; extracting a feature of the clustered point cloud data; and matching extracted feature information with feature information of the preset target object to obtain the confidence that the $N^{th}$ detection sub-range includes the preset target object. This embodiment of this application imposes no limitation on a type of feature extracted after clustering.

In an optional embodiment of this application, after clustering the obtained point cloud data in the $N^{th}$ detection sub-range, the method further includes: judging whether the clustered point cloud data is in an adjacent boundary region of the $N^{th}$ detection sub-range and an $(N-1)^{th}$ detection sub-range or an $(N+1)^{th}$ detection sub-range; and if the clustered point cloud data is in the boundary region, obtaining a part or all of point cloud data in the $(N-1)^{th}$ detection sub-range or the $(N+1)^{th}$ detection sub-range based on the preset rule, to perform integration, and outputting an identification result. The preset rule may be, for example, determining whether to obtain a part or all of point cloud data in the $(N-1)^{th}$ detection sub-range and the $(N+1)^{th}$ detection sub-range based on a size of the $(N-1)^{th}$ detection sub-range or the $(N+1)^{th}$ detection sub-range, to perform integration and output an identification result. Taking a case that the clustered point cloud data is in the adjacent boundary region of the $N^{th}$ detection sub-range and an $(N-1)^{th}$ detection sub-range as an example, if the $(N-1)^{th}$ detection sub-range (for example, a detection range corresponding to an angle of view of the mechanical LiDAR that is less than 10°) is less than the preset threshold, the entire $(N-1)^{th}$ detection sub-range is integrated with the $N^{th}$ detection sub-range, and then an identification result is output. If the $(N-1)^{th}$ detection sub-range (for example, a detection range corresponding to an angle of view of the mechanical LiDAR that is greater than 10°) is greater than the preset threshold, a proportion of a corresponding integrated part of the $(N-1)^{th}$ detection sub-range to the whole $(N-1)^{th}$ detection sub-range is set based on the preset rule. The proportion of the part to the whole is related to a size of the clustered point cloud data and a size of the $(N-1)^{th}$ detection sub-range. It can be understood that, the larger the size of the clustered point cloud is, the smaller the size of the detection sub-range is, and the larger the proportion of the integrated part to the whole is. Specific partial integration is shown in FIG. 6. FIG. 6 shows detection regions respectively corresponding to detection sub-ranges 401, 402, and 403 when parts of the detection sub-ranges are integrated. In a case of non-overlapping and equal division of angles, detection angles respectively corresponding to the detection sub-ranges 401, 402, and 403 are all 5°. For example, angles 401a, 402a, and 403a in the figure are all 5°. In a case of overlapping and equal division of angles, an overlapped part of any detection sub-range is set as one fifth of an angle corresponding to a previous detection sub-range in the preset sequence. Taking the detection sub-range 402 as an example, in a case of an overlapped part, an overlapped part of the detection sub-range 402 is one fifth of the detection sub-range 401 adjacent to an edge of the detection sub-range 402, for example, a in the figure. In this embodiment, a is equal to 1°. An object at the boundary of the detection sub-range is identified, to set a partially integrated region, so that identification confidence of objects in left and right boundary regions of the detection sub-range can be effectively improved, thereby outputting an identification result and further improving detection real-time performance of the target object.

In the obstacle detection method provided in this application, an output mode of the LiDAR is changed, the detection range of the LiDAR is divided into multiple sub-ranges, and the multiple sub-ranges are detected in the preset sequence, confidence of the multiple sub-ranges is obtained and accumulated in real time, and the detection result of the obstacle is output when the detected confidence exceeds the preset confidence. In the obstacle detection method provided in this application, detection is performed sequentially and data is output, thereby improving the detection efficiency of the obstacle and the detection real-time performance.

Figure 8:
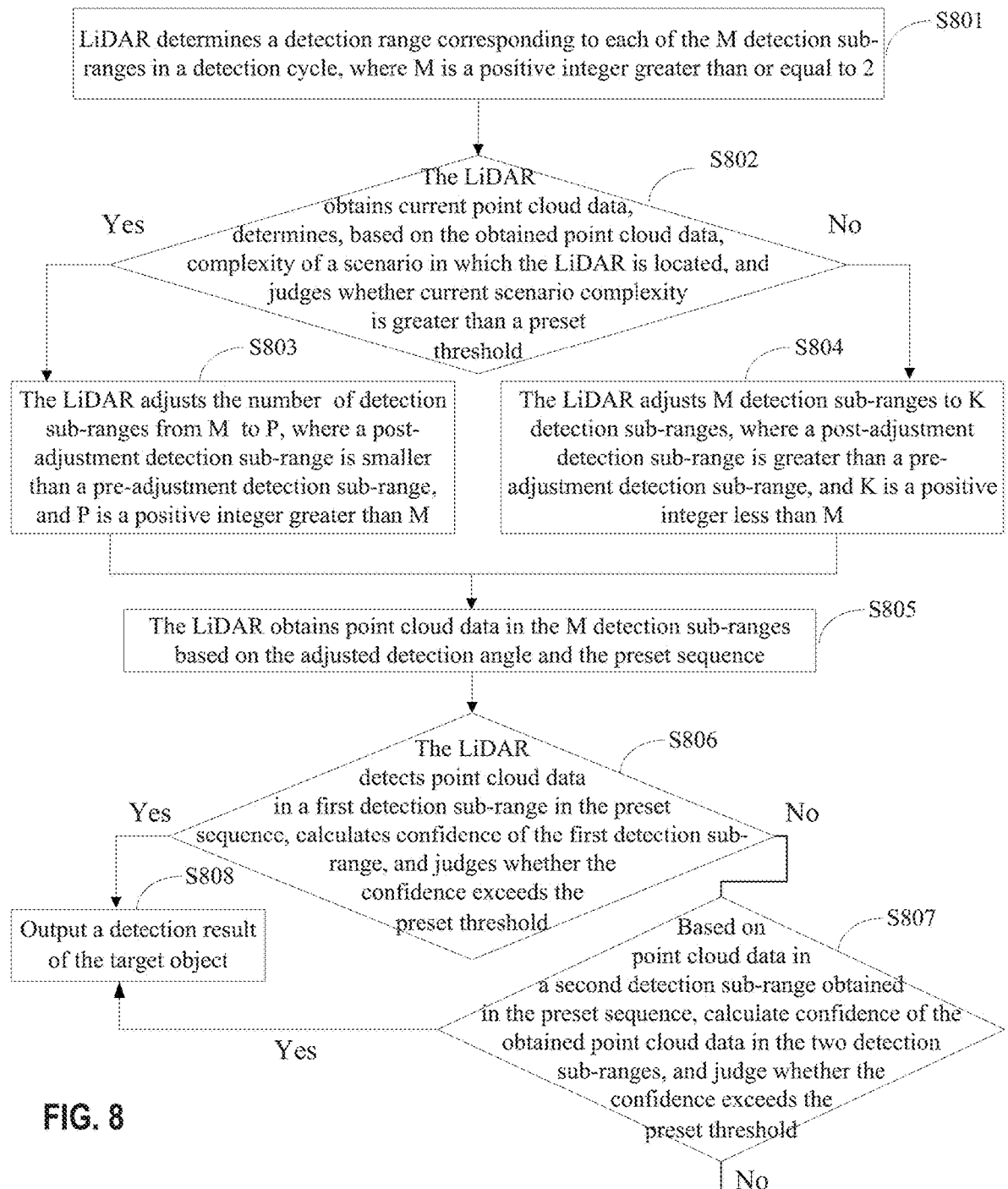
FIG. 8 is a schematic flowchart of another obstacle detection method according to an embodiment of this application.

Referring to FIG. 8, FIG. 8 is a schematic flowchart of another obstacle detection method according to an embodiment of this application. Taking the rotary mechanical LiDAR shown in FIG. 5 as an example, the method includes:

S801. LiDAR determines a detection range corresponding to each of the M detection sub-ranges in a detection cycle, where M is a positive integer greater than or equal to 2.

Specifically, taking the rotary mechanical LiDAR as an example, a detection angle corresponding to one rotation cycle of the rotary mechanical LiDAR is 360°. If M=6, detection angles of 60° respectively corresponding to the 6 detection sub-ranges are obtained in the preset sequence. The preset sequence may include, but is not limited to, a scanning sequence of a radar. For a specific dividing method of the detection sub-range, refer to the foregoing embodiments. Details are not described in this embodiment again.

S802. The LiDAR obtains current point cloud data, determines, based on the obtained point cloud data, complexity of a scenario in which the LiDAR is located, and judges whether current scenario complexity is greater than a preset threshold; and if yes, the LiDAR performs step S803; or if no, the LiDAR performs step S804.

Determining, based on the obtained point cloud data, the complexity of the scenario in which the LiDAR is located including: obtaining current ambient information of the LiDAR based on the point cloud data of the LiDAR; and determining, based on the current ambient information of the LiDAR, the complexity of the scenario in which the LiDAR is located.

The ambient information may include scenario information and obstacle information. The scenario information may include number information of traffic lights, intersection information, crosswalk information, and lane line information. The obstacle information may include, for example, the number of obstacles, a position of the obstacle, speed information of the obstacle, and movement direction information of the obstacle.

Determining, based on the current ambient information of the LiDAR, the complexity of the scenario in which the LiDAR is located specifically includes: determining, based on the ambient information, information about a road in which the radar is located, where the information about the road includes a lane in which the radar is located.

The obstacle information of the lane in which the radar is located is determined based on the ambient information. The obstacle information includes the number of obstacles, a position of the obstacle, a speed of the obstacle, and a moving direction of the obstacle.

The complexity of the scenario in which the radar is located is determined based on the obstacle information of the lane in which the radar is located.

In an optional embodiment, determining, based on the current ambient information of the LiDAR, the complexity of the scenario in which the LiDAR is located may further include: determining, based on the ambient information obtained by the LiDAR, the scenario in which the LiDAR is located;
    determining, based on the ambient information, the number of obstacles and the speed of the obstacle in the scenario in which the radar is located; and
    determining, based on the number of obstacles and the speed of the obstacle in the scenario, the complexity of the scenario in which the LiDAR is located.

Specifically, the LiDAR detects current driving ambient information, determines, based on the ambient information, the scenario in which the LiDAR is located, determines the scenario complexity, and compares the current scenario complexity with the preset threshold. When the scenario complexity is greater than the preset threshold, step S803 is performed; or when the scenario complexity is less than the preset threshold, step S804 is performed. For details about the driving ambient information, a driving scenario, and the scenario complexity, refer to the foregoing embodiment. Details are not described in this embodiment again.

It can be understood that the greater the scenario complexity is, the higher the real-time performance requirement for the target detection region is, and the greater the number of divided detection sub-ranges in the preset rule is.

It can be understood that the scenario includes an intersection scenario, a highway scenario, or an urban mad scenario. It can be understood that the intersection scenario has a highest real-time performance requirement for a target detection region, and therefore, the number of divisions of the target detection region is the maximum in the intersection scenario, followed by the urban mad scenario and then the highway scenario.

S803. The LiDAR adjusts the number of detection sub-ranges from M to P, where a post-adjustment detection sub-range is smaller than a pre-adjustment detection sub-range, and P is a positive integer greater than M.

Specifically, if the scenario complexity that is detected by LiDAR within the detection range and that is characterized by the current ambient information is greater than the preset threshold, the number of detection sub-ranges is adjusted from M to P, and a post-adjustment detection sub-range is less than a pre-adjustment detection sub-range. That is, a detection angle corresponding to the detection sub-range is decreased, and the number of detection sub-ranges is increased. For a specific adjustment method, refer to the foregoing embodiment. For a specific implementation that the scenario complexity is greater than the preset threshold in actual application, also refer to the foregoing embodiment. Details are not described in this embodiment again.

S804. The LiDAR adjusts M detection sub-ranges to K detection sub-ranges, where a post-adjustment detection sub-range is greater than a pre-adjustment detection sub-range, and K is a positive integer less than M.

Specifically, if the scenario complexity that is detected by LiDAR within the detection range and that is characterized by the current ambient information is less than the preset threshold, the number of detection sub-ranges is adjusted from M to K, and a post-adjustment detection sub-range is greater than a pre-adjustment detection sub-range. That is, a detection angle corresponding to the detection sub-range is increased, and the number of detection sub-ranges is decreased. For a specific adjustment method, refer to the foregoing embodiment. For a specific implementation that the scenario complexity is less than the preset threshold in actual application, refer to the foregoing embodiment. Details are not described in this embodiment again.

For example, if the ambient information obtained by the rotary mechanical LiDAR in this embodiment indicates that density of obstacles within the detection range of the LiDAR exceeds a preset degree, then step S903 is performed, and the number of the detection sub-ranges of the rotary mechanical LiDAR is adjusted from 6 to 10. That is, a detection angle corresponding to each detection sub-range is 36°. It should be noted that, in this embodiment of this application, when a preset adjustment condition is satisfied, the number of M or K is not limited, and an adjustment standard can be set manually.

S805. The LiDAR obtains point cloud data in the M detection sub-ranges based on the adjusted detection angle and the preset sequence.

Specifically, the LiDAR obtains point cloud data in any detection sub-range based on the adjusted detection angle of 36° corresponding to each detection sub-range and the preset sequence.

S806. The LiDAR detects point cloud data in a first detection sub-range in the preset sequence, calculates confidence that the first detection sub-range includes the preset target object, and judges whether the confidence exceeds the preset threshold; and if yes, the LiDAR performs step S808, or if no, the LiDAR performs step S807.

Specifically, when the LiDAR detects the point cloud data in the first detection sub-range in the preset sequence, the point cloud data in the first detection sub-range is clustered, and a feature is extracted from the clustered point cloud data. For example, a polygonal envelope or a rectangular frame of the clustered point cloud data is calculated to estimate feature information of the clustered point cloud data, then the foregoing obtained feature information is matched with feature information of the preset target object to obtain confidence that the point cloud data in the first detection sub-range includes the preset target object, and it is judged whether the confidence exceeds the preset threshold; and if yes, the LiDAR performs step S808, or if no, the LiDAR performs S807.

S807. The LiDAR accumulates obtained point cloud data in a second detection sub-range in the preset sequence, calculates confidence of the obtained point cloud data in the two detection sub-ranges, and judges whether the confidence exceeds the preset threshold; and if yes, the LiDAR performs step S808; or if no, the LiDAR continues calculating confidence that integrated point cloud data of point cloud data in a next detection sub-range and the previously accumulated point cloud data includes the target object, and when the confidence exceeds the threshold, the LiDAR outputs an identification result of an obstacle, otherwise, the LiDAR continues accumulating and integrating the point cloud data in the detection sub-range in the preset sequence, and if point cloud data of the $M^{th}$ detection sub-range is accumulated, the LiDAR outputs an integration and identification result of a point cloud data frame.

For a specific point cloud data accumulation method and a confidence calculation method, refer to the foregoing embodiment. Details are not described in this embodiment again.

S808. Output a detection result of the obstacle when the confidence exceeds the preset threshold.

Specifically, if the confidence exceeds the preset threshold, the detection result of the obstacle is output, and the detection result is displayed on the vehicle-mounted terminal. For contents specifically included in the detection result of the obstacle, refer to the foregoing embodiment. Details are not described in this embodiment again.

In this embodiment of this application, the scenario complexity is monitored in real time, to adjust the number of detection sub-ranges and the dividing method, thereby increasing flexibility and accuracy of real-time monitoring of the obstacle. In addition, in the obstacle detection method provided in this application, the entire point cloud data frame is divided to obtain multiple detection sub-ranges, the detection sub-ranges are detected in the preset sequence, and the confidence is calculated. If the confidence does not exceed the preset confidence threshold, the point cloud data in the next detection sub-range and the current point cloud data are integrated in the preset sequence and detected. The post-integration confidence is obtained until the obtained confidence exceeds the preset confidence threshold, and the detection result of the obstacle is output and displayed on the vehicle-mounted terminal. In the method, detection time of the target object is effectively reduced and the real-time performance is improved.

Figure 9:
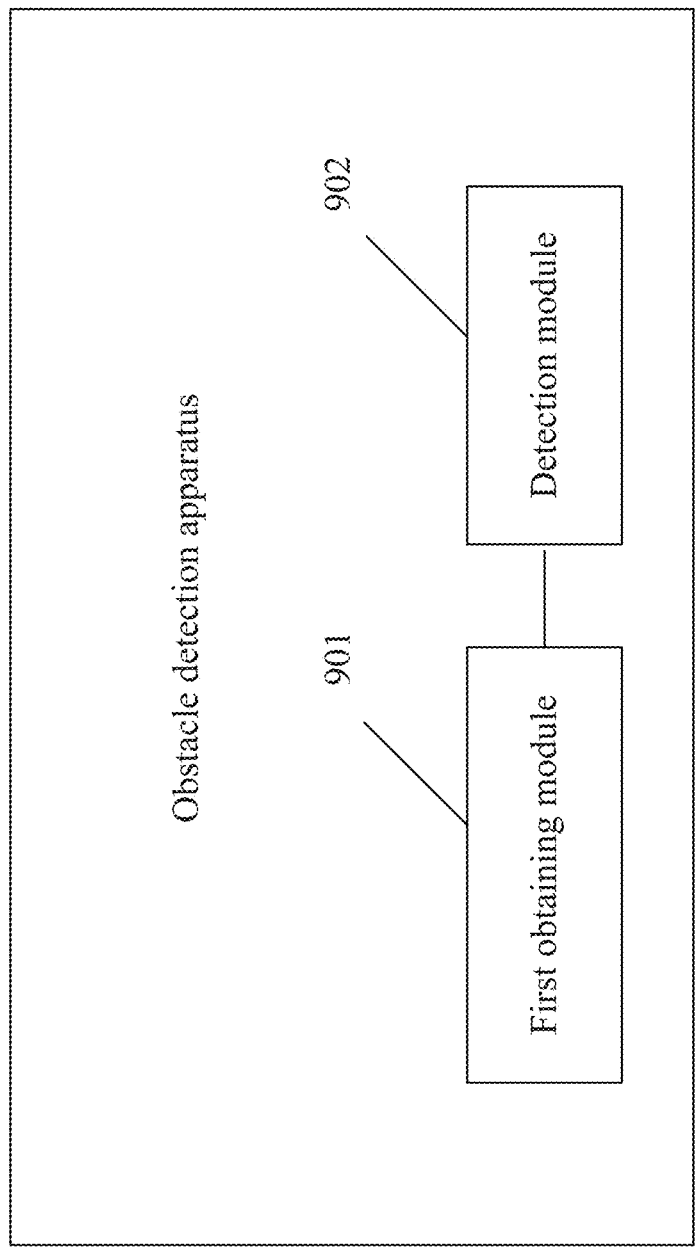
FIG. 9 is a schematic diagram of an obstacle detection apparatus according to an embodiment of this application.

Referring to FIG. 9, based on the obstacle detection method, FIG. 9 is a schematic diagram of an obstacle detection apparatus according to an embodiment of this application. The apparatus includes:

a first obtaining module 901, configured to obtain point cloud data in an $N^{th}$ detection sub-range of LiDAR in a preset sequence, where a detection range of the LiDAR in a detection cycle includes M detection sub-ranges, the $N^{th}$ detection sub-range is any one of the M detection sub-ranges, M is an integer greater than or equal to 2, and N is an integer less than or equal to M; and a detection module 902, configured to: calculate confidence that the $N^{th}$ detection sub-range includes a preset target object based on the obtained point cloud data in the $N^{th}$ detection sub-range; and if the confidence is greater than or equal to a preset threshold, output an identification result of the preset target object.

In some embodiments, the apparatus further includes:

a first calculation module, configured to: if the confidence that the $N^{th}$ detection sub-range includes the preset target object is less than the preset threshold, obtain point cloud data in an $(N+1)^{th}$ detection sub-range, integrate point cloud data in the two detection sub-ranges, and calculate confidence that the two detection sub-ranges include the preset target object:

an outputting module, configured to: if the confidence is greater than or equal to the preset threshold, output an identification result of the obstacle; and a second calculation module, configured to: if the confidence is less than the preset threshold, continue obtaining point cloud data in an $(N+2)^{th}$ detection sub-range, integrate the point cloud data in the $(N+2)^{th}$ detection sub-range with the point cloud data in the $N^{th}$ detection sub-range and the $(N+1)^{th}$ detection sub-range, and calculate confidence that the multiple integrated detection sub-ranges include the preset target object based on integrated point cloud data, where $N+2 \leq M$.

In some embodiments, the apparatus further includes:

a dividing module, configured to: determine a dividing method for the M detection sub-ranges, where the dividing method includes: performing division based on detection time corresponding to one detection cycle of the LiDAR, or performing division based on a detection range corresponding to one detection cycle of the LiDAR.

The first obtaining module 901 is specifically configured to:

based on the detection time corresponding to the detection cycle of the LiDAR, determine detection time corresponding to each one of the M detection sub-ranges; obtain first detection time corresponding to the $N^{th}$ detection sub-range; and when the LiDAR runs at the first detection time, obtain the point cloud data corresponding to the $N^{th}$ detection sub-range in a scanning sequence of the LiDAR; and/or based on the detection range corresponding to the detection cycle of the LiDAR, determine a detection range corresponding to each one of the M detection sub-ranges; obtain a first detection range corresponding to the $N^{th}$ detection sub-range; and when the LiDAR scans in the first detection range, obtain the point cloud data corresponding to the $N^{th}$ detection sub-range in a scanning sequence of the LiDAR.

In some embodiments, the apparatus further includes:

a second obtaining module, configured to: before the first obtaining module 901 obtains the point cloud data in the $N^{th}$ detection sub-range of the LiDAR in the preset sequence, obtain ambient information of the LiDAR;

a first determining module, configured to: based on the ambient information, determine a scenario in which the LiDAR is located; and a first adjustment module, configured to adjust the number M of detection sub-ranges included in the detection range in the detection cycle of the LiDAR based on the scenario.

In some embodiments, the apparatus further includes:

a second determining module, configured to determine scenario complexity of the scenario in which the LiDAR is located;

a judging module, configured to judge whether the scenario complexity is greater than a preset threshold; and a second adjustment module, configured to: when the scenario complexity is greater than the preset threshold, based on a value of the scenario complexity, readjust the number M of detection sub-ranges corresponding to the detection cycle of the LiDAR.

In some embodiments, the apparatus further includes:

a third determining module, configured to: before the first obtaining module 901 obtains the point cloud data in the $N^{th}$ detection sub-range of the LiDAR in the preset sequence, determine a common detection range and a target detection range within the detection range of the LiDAR, where the target detection range is a key detection region preset by a user; and a fourth determining module, configured to determine a preset dividing rule for the M detection sub-ranges based on the common detection range and the target detection range.

In some embodiments, the detection module 902 includes:

a clustering unit, configured to cluster the obtained point cloud data in the $N^{th}$ detection sub-range;

a feature extraction unit, configured to extract a feature of clustered point cloud data; and a matching unit, configured to match extracted feature information with feature information of the preset target object to obtain the confidence that the $N^{th}$ detection sub-range includes the preset target object.

Figure 10:
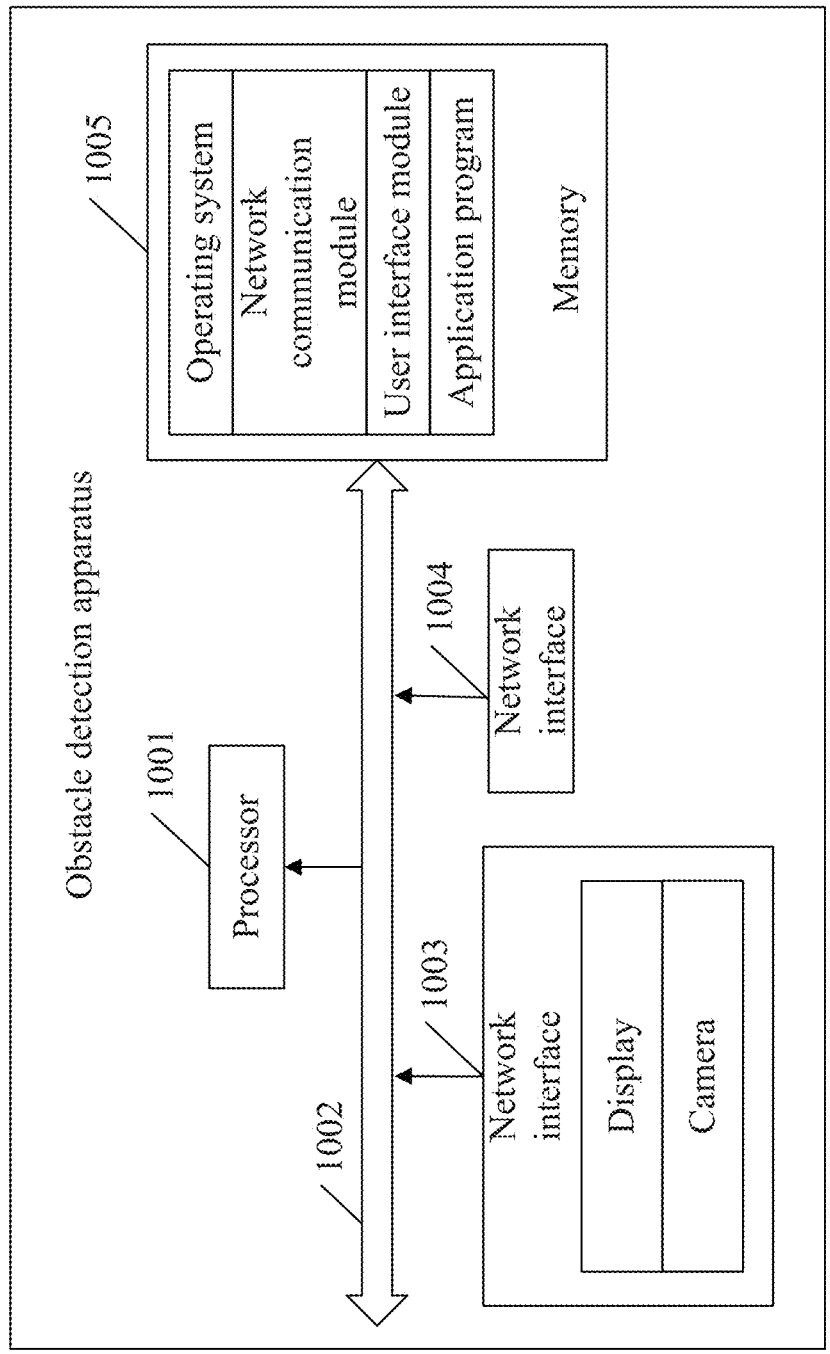
FIG. 10 is a schematic diagram of another obstacle detection apparatus according to an embodiment of this application.

Referring to FIG. 10, FIG. 10 is a schematic structural diagram of another obstacle detection apparatus according to an embodiment of this application. The obstacle detection apparatus may at least include: at least one processor 1001, such as a CPU, at least one network interface 1004, a user interface 1003, a memory 1005, and at least one communications bus 1002. The communications bus 1002 is configured to implement a connection and communication between these components. The user interface 1003 may include, but is not limited to, a camera, a display, a touchscreen, a keyboard, a mouse, and a joystick. Optionally, the network interface 1004 may include a standard wired interface or a wireless interface (for example, a WiFi interface), and a communication connection to a server may be established through the network interface 1004. The memory 1002 may be a high-speed RAM memory, or a non-volatile memory (non-volatile memory), such as at least one magnetic disk memory. As shown in FIG. 10, as a computer storage medium, the memory 1005 may include an operating system, a network communications module, a user interface module, and a program instruction.

It should be noted that the network interface 1004 may be connected to a receiver, a transmitter, or another communications module, and the another communications module may include but is not limited to a WiFi module, or a network communications module of an operator. It can be understood that, in this embodiment of this application, the obstacle detection apparatus may also include the receiver, the transmitter, the another communications module, and the like.

The processor 1001 can be used to invoke the program instruction stored in the memory 1005 to perform the following method:

obtaining point cloud data in an $N^{th}$ detection sub-range of LiDAR in a preset sequence, where a detection range of the LiDAR in a detection cycle includes M detection sub-ranges, the $N^{th}$ detection sub-range is any one of the M detection sub-ranges. M is an integer greater than or equal to 2, and N is an integer less than or equal to M; and calculating confidence that the $N^{th}$ detection sub-range includes a preset target object based on the obtained point cloud data in the $N^{th}$ detection sub-range; and if the confidence is greater than or equal to a preset threshold, outputting an identification result of the preset target object.

Possibly, the processor 1001 is further configured to:

if the confidence that the $N^{th}$ detection sub-range includes the preset target object is less than the preset threshold, obtain point cloud data in an $(N+1)^{th}$ detection sub-range, integrate point cloud data in the two detection sub-ranges, and calculate confidence that the two detection sub-ranges include the preset target object;

if the confidence is greater than or equal to the preset threshold, output an identification result of the obstacle; and if the confidence is less than the preset threshold, continue obtaining point cloud data in an $(N+2)^{th}$ detection sub-range, integrate the point cloud data in the $(N+2)^{th}$ detection sub-range with the point cloud data in the $N^{th}$ detection sub-range and the $(N+1)^{th}$ detection sub-range, and calculate confidence that the multiple integrated detection sub-ranges include the preset target object based on integrated point cloud data, where $N+2 \leq M$.

Possibly, before obtaining the point cloud data in the $N^{th}$ detection sub-range of the LiDAR in the preset sequence, the processor 1001 is further configured to:

determine a dividing method for the M detection sub-ranges, where the dividing method includes: performing division based on detection time corresponding to one detection cycle of the LiDAR, or performing division based on a detection range corresponding to one detection cycle of the LiDAR, where when obtaining the point cloud data in the $N^{th}$ detection sub-range of the LiDAR in the preset sequence, the processor 1001 is specifically configured to:

based on the detection time corresponding to the detection cycle of the LiDAR, determine detection time corresponding to each one of the M detection sub-ranges; obtain first detection time corresponding to the $N^{th}$ detection sub-range; and when the LiDAR runs at the first detection time, obtain the point cloud data corresponding to the $N^{th}$ detection sub-range in a scanning sequence of the LiDAR; and/or based on the detection range corresponding to the detection cycle of the LiDAR, determine a detection range corresponding to each detection sub-range of the M detection sub-ranges; obtain a first detection range corresponding to the $N^{th}$ detection sub-range; and when the LiDAR scans in the first detection range, obtain the point cloud data corresponding to the $N^{th}$ detection sub-range in a scanning sequence of the LiDAR.

Possibly, before obtaining the point cloud data in the $N^{th}$ detection sub-range of the LiDAR in the preset sequence, the processor 1001 is further configured to:

obtain ambient information of the LiDAR;

based on the ambient information, determine a scenario in which the LiDAR is located; and adjust the number M of detection sub-ranges included in the detection range in the detection cycle of the LiDAR based on the scenario.

Possibly, the processor 1001 is further configured to:

determine scenario complexity of the scenario in which the LiDAR is located;

judge whether the scenario complexity is greater than a preset threshold; and when the scenario complexity is greater than the preset threshold, based on a value of the scenario complexity, readjust the number M of detection sub-ranges corresponding to the detection cycle of the LiDAR.

Possibly, before obtaining the point cloud data in the $N^{th}$ detection sub-range of the LiDAR in the preset sequence, the processor 1001 is further configured to:

determine a common detection range and a target detection range within the detection range of the LiDAR, where the target detection range is a key detection region preset by a user; and determine a preset dividing rule for the M detection sub-ranges based on the common detection range and the target detection range.

Possibly, when calculating confidence that the $N^{th}$ detection sub-range includes a preset target object based on the obtained point cloud data in the $N^{th}$ detection sub-range, the processor 1001 is specifically configured to:

cluster the obtained point cloud data in the $N^{th}$ detection sub-range;

extract a feature of clustered point cloud data; and match extracted feature information with feature information of the preset target object to obtain the confidence that the $N^{th}$ detection sub-range includes the preset target object.

An embodiment of this application further provides a computer-readable storage medium, where the computer-readable storage medium stores an instruction, and when running on the computer or the processor, the instruction enables the computer or the processor to perform one or more steps in any one of the foregoing methods. If each component module in the foregoing obstacle detection apparatus is implemented in a form of a software functional unit and sold or used as an independent product, the component module can be stored in the computer-readable storage medium.

Figure 11:
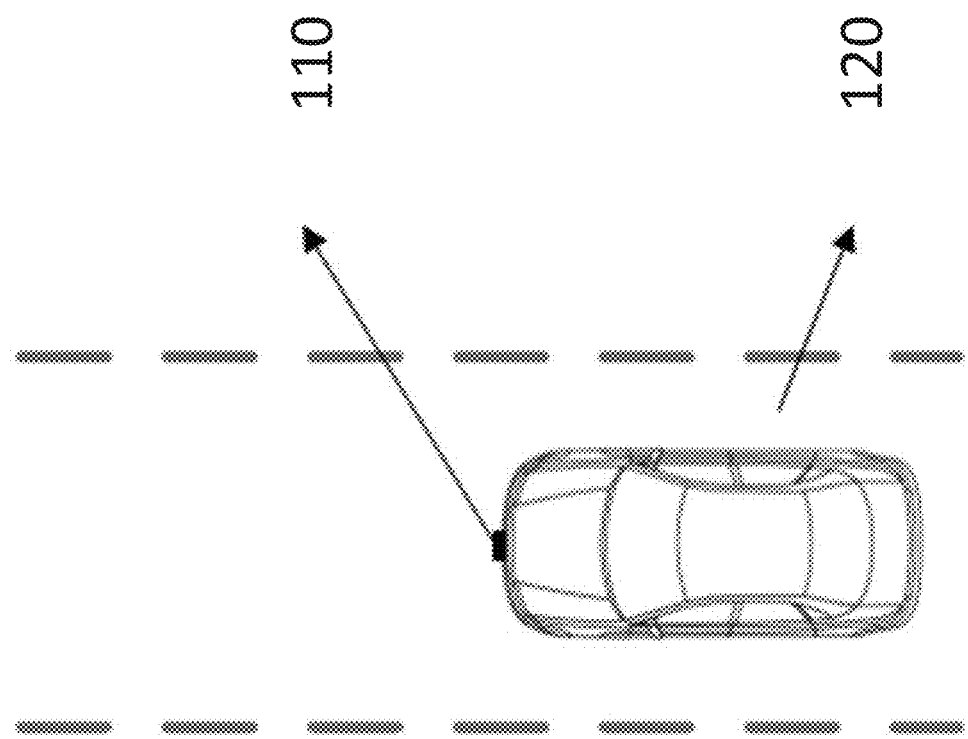
FIG. 11 is a schematic diagram of an application scenario of a data processing method according to an embodiment of this application.
Figure 12:
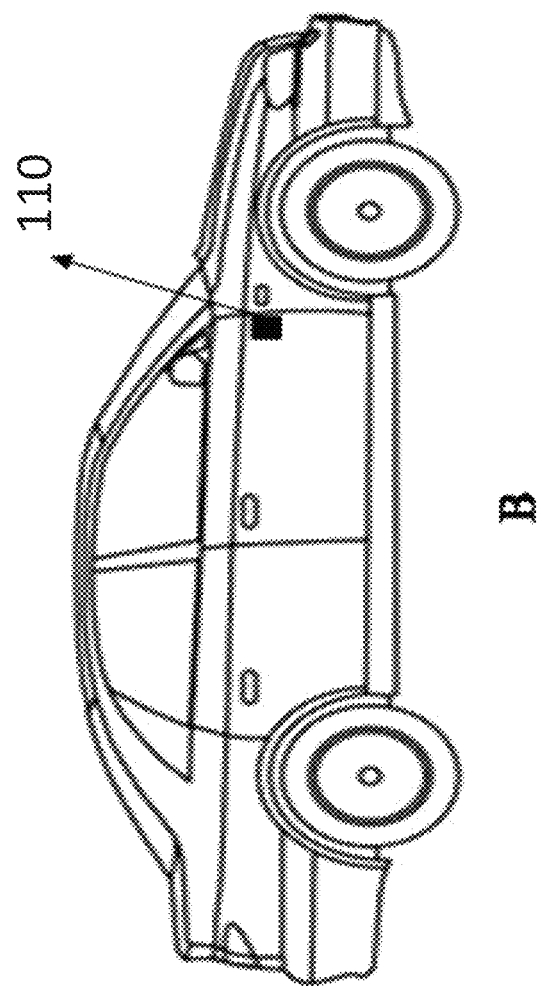
FIG. 12 is a schematic diagram of a mounting position of a sensor according to an embodiment of this application.
Figure 12:
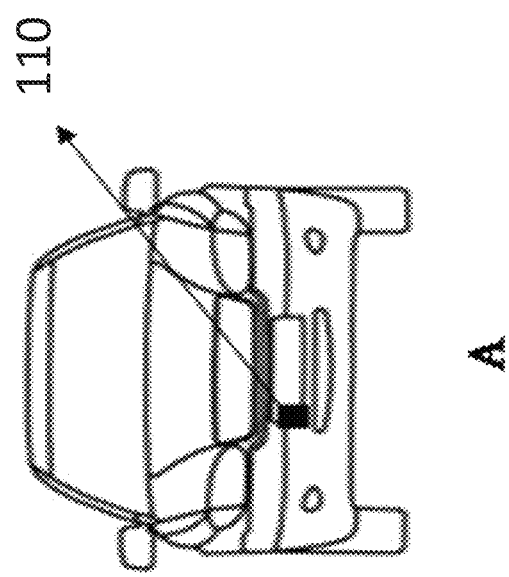

Referring to FIG. 11 and FIG. 12, FIG. 11 is a schematic diagram of an application scenario of a data processing method according to an embodiment of this application. The schematic diagram of the application scenario includes a sensor 110 and a vehicle 120. The data processing method provided in this application is applied to the sensor 110. The sensor 110 is mounted on the vehicle 120. As shown in FIG. 12, FIG. 12 is a schematic diagram of a mounting position of a sensor according to an embodiment of this application.

The sensor 110 may include a scanning sensor and a non-scanning sensor, and is configured to obtain point cloud data within a detection range of the sensor, and process the obtained point cloud data. The scanning sensor may include but is not limited to LiDAR, such as micro-electro-mechanical system (Micro-Electra-Mechanical System, MEMS) solid-state LiDAR, and rotary mechanical scanning LiDAR. The non-scanning sensor may include but is not limited to an image sensor or solid-state LiDAR. The image sensor may be, for example, a digital camera or an analog camera. The solid-state LiDAR may be, for example, flash LiDAR. In this embodiment of this application, an automatic driving sensing system may include one sensor 110. As shown in FIG. 12, when performing forward collection of point cloud data, the sensor 110 may be mounted at a position shown in A. It can be understood that the sensor 110 can also be mounted at a position shown in B. In this embodiment of this application, a specific mounting position of the sensor 110 is not limited. It can be understood that, in this embodiment of this application, as shown in FIG. 12, the automated driving sensing system may also include multiple sensors. Herein, when the automated driving sensing system includes the multiple sensors, the number and the type of sensors included in the automated driving sensing system are not specifically limited. The sensor 110 may be any sensor in the automated driving sensing system, and this application imposes no limitation on a specific composition form of the automated driving sensing system.

The vehicle 120 can include a car, a bus, a semi-trailer, an off-road vehicle, a dedicated vehicle, a truck, a tractor, a dump truck, or any other type of vehicle. A series, a type, or a model of the vehicle 120 is not limited herein. In this embodiment of this application, the vehicle can travel on a road such as a crossing, an intersection, or an expressway without affecting traffic. In this embodiment of this application, the vehicle 120 may obtain point cloud data within a preset detection range by using the sensor 110, and the sensor 110 processes the obtained point cloud data, and displays a processing result on the vehicle-mounted terminal.

Next, a data processing method provided in an embodiment of this application is described with reference to both the schematic diagram of the application scenario of the data processing method shown in FIG. 11 and the schematic diagram of the mounting position of the sensor shown in FIG. 12.

Figure 13:
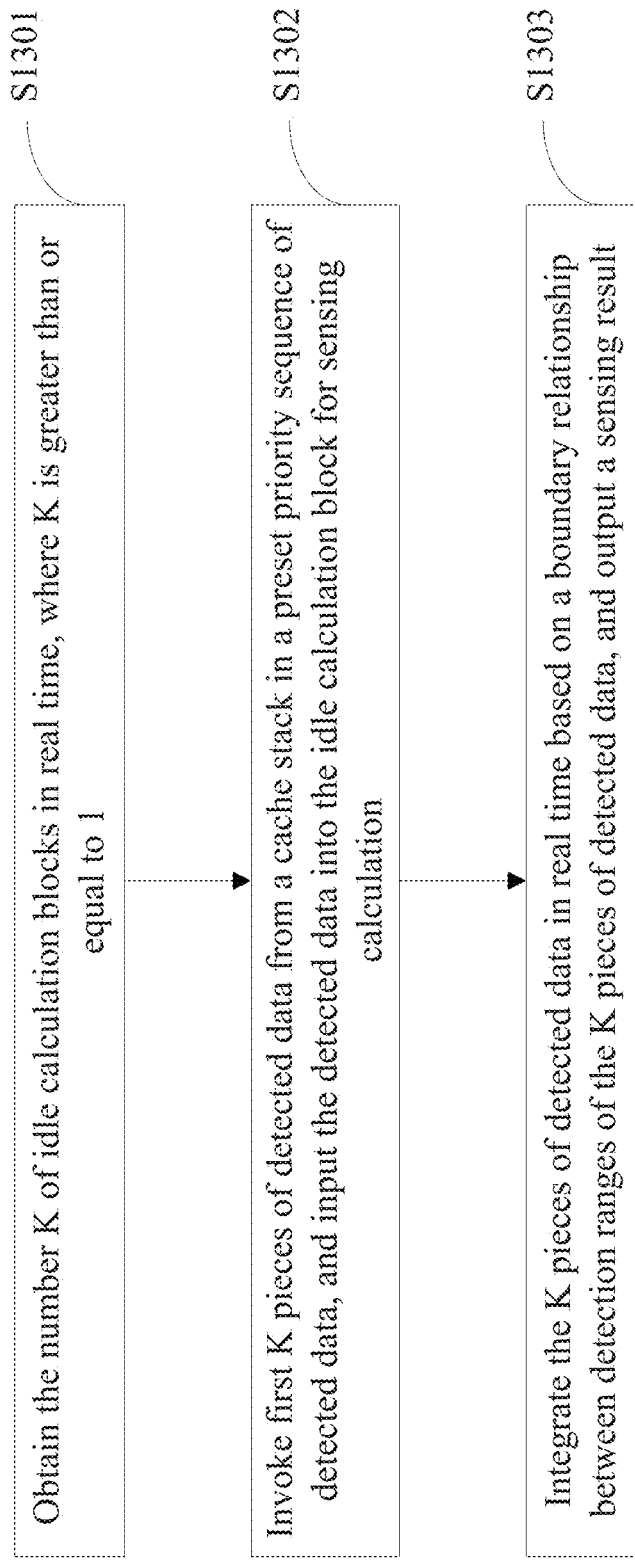
FIG. 13 is a schematic flowchart of a data processing method according to an embodiment of this application.

Referring to FIG. 13, FIG. 13 is a schematic flowchart of a data processing method according to an embodiment of this application. The method includes the following steps:

S1301. Obtain the number K of idle calculation blocks in real time, where K is greater than or equal to 1.

Specifically, a task scheduling system inside the sensor detects an idle block in multiple calculation blocks in real time, and obtains the number K of idle calculation blocks, where K is greater than or equal to 1. A calculation module inside the sensor includes multiple calculation blocks, and during a sensing calculation process, the calculation blocks do not interfere with each other.

S1302. Invoke first K pieces of detected data from a cache stack in a preset priority sequence of detected data, and input the detected data into the idle calculation block for sensing calculation.

Specifically, after obtaining the number K of idle calculation blocks, the sensor invokes the first K pieces of detected data from the cache stack based on the number of idle calculation blocks, and inputs the K pieces of detected data into the idle calculation block in a preset priority sequence for sensing calculation.

Further, before the first K pieces of detected data are invoked from the cache stack in the preset priority sequence of the detected data and input into the idle calculation block for sensing calculation, the method further includes: dividing one point cloud data frame into M pieces of detected data, where and storing data information of the detected data and priority information corresponding to the detected data into the cache stack each time one piece of detected data is obtained.

Further, dividing one point cloud data frame into M pieces of detected data includes: determining, based on a type of sensor, a method for dividing the point cloud data frame into the M pieces of detected data, where the dividing method includes at least one of the following: if the sensor is a scanning sensor, performing division based on detection time corresponding to a point cloud data frame detected by the scanning sensor, or performing division based on a detection angle corresponding to the point cloud data frame detected by the scanning sensor or performing division based on the detection time and a spatial region corresponding to the point cloud data frame detected by the scanning sensor; or if the sensor is a non-scanning sensor, performing division based on a spatial region corresponding to detected data detected by the non-scanning sensor once.

Further, after dividing one point cloud data frame into M pieces of detected data, the method further includes: sequentially obtaining the M pieces of detected data in the preset priority sequence. Sequentially obtaining the M pieces of detected data in the preset priority sequence includes: if the sensor is the scanning sensor, determining detection time corresponding to each piece of detected data, and sequentially obtaining the M pieces of detected data within the detection range of the sensor in a chronological sequence of the detection time. If the sensor is the scanning sensor, the detection angle corresponding to each piece of detected data is determined, and M pieces of detected data within the detection range of the sensor are sequentially obtained in a chronological sequence of detection angle. If the sensor is the scanning sensor, detection time and a spatial region corresponding to each piece of detected data are determined, a priority sequence corresponding to each piece of detected data is determined in a chronological sequence of the detection time and the priority sequence of the spatial region, and M pieces of detected data within the detection range of the sensor are sequentially obtained in the priority sequence. If the sensor is the non-scanning sensor, a spatial region corresponding to each piece of detected data is determined, and M pieces of detected data within the detection range of the sensor are sequentially obtained in a priority sequence of the spatial region.

Specifically, the scanning sensor such as the MEMS solid-state LiDAR performs scanning through a simple harmonic motion of a scanning mirror, and therefore, a scanning path of the scanning sensor can implement, for example, a scanning field of view with a reciprocating motion from top to bottom on a slow axis and a reciprocating motion from left to right on a fast axis in a spatial sequence. For another example, mechanical LiDAR performs scanning by driving an optical system to rotate 360 degrees through a mechanical drive device, to form a cylindrical detection region with the LiDAR as the center. In addition, the non-scanning sensor such as a camera processes an image by using an internal photosensitive component circuit and a control component, converts the image into a digital signal identifiable to a computer, and then inputs the digital signal into the computer through a parallel port or a USB connection, to recover the image by using software.

Figure 14:
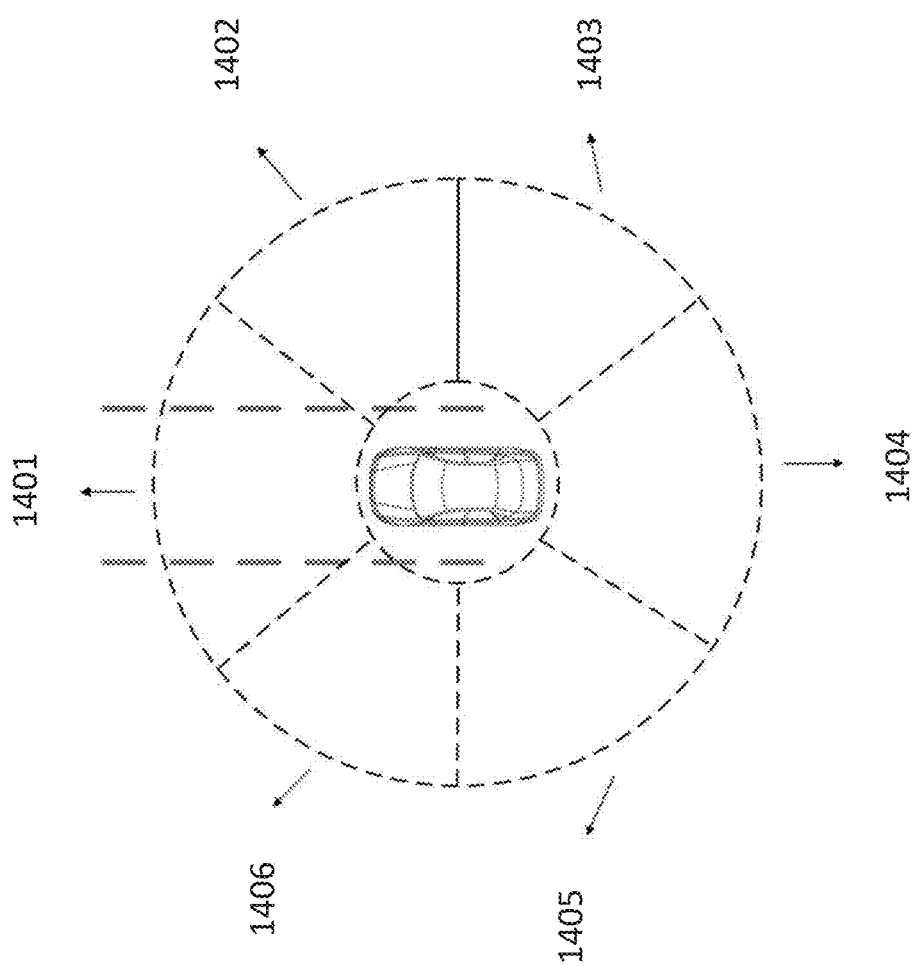
FIG. 14 is a schematic diagram of splitting one data frame by rotary mechanical LiDAR into multiple detected data according to an embodiment of this application.

Referring to the schematic diagram shown in FIG. 14, taking the mechanical LiDAR in the scanning sensor as an example, the mechanical LiDAR performs scanning by driving an optical system to rotate 360 degrees through a mechanical drive device, to form a cylindrical detection region with the LiDAR as the center. Therefore, a detection range corresponding to 360° rotation of the mechanical LiDAR is a detection range corresponding to detection of one data frame, and therefore, a detection range of the mechanical LiDAR in one cycle is usually divided based on a degree of rotation. If N is equal to 6, based on a principle of equal division, one data frame detected by the mechanical LiDAR can be divided into 6 pieces of detected data. That is, each piece of detected data is corresponding to 60°. In other words, one piece of detected data is formed each time the mechanical LiDAR rotates 60°. That is, six pieces of detected data 1401, 1402, 1403, 1404, 1405, and 1406 in the figure each are 60°.

Figure 15:
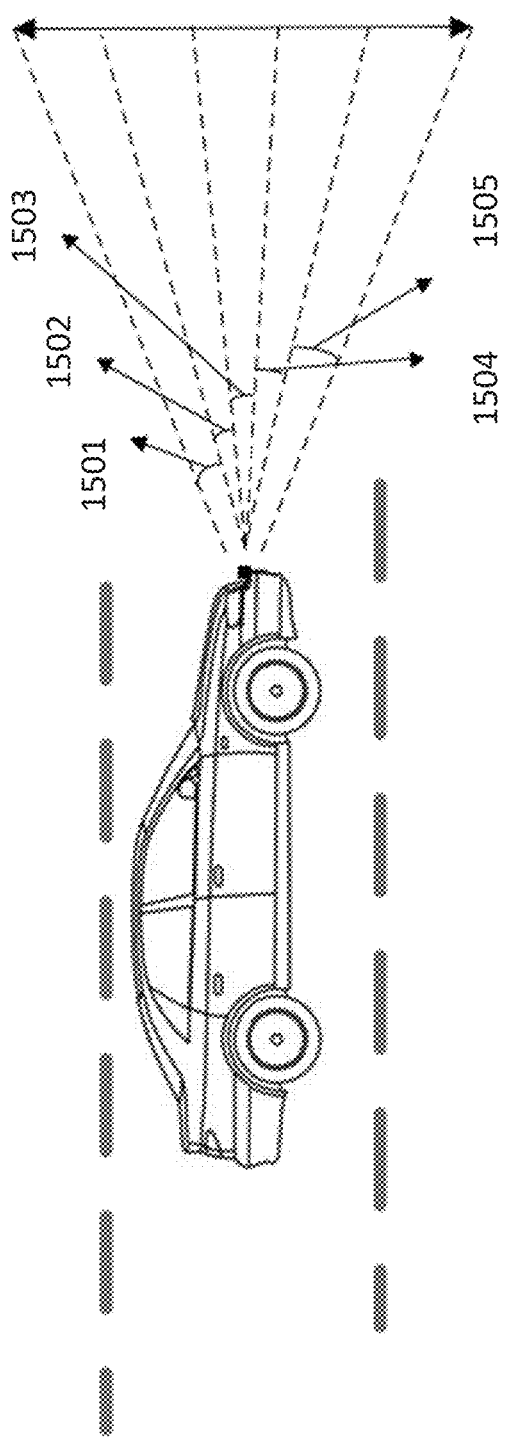
FIG. 15 is a schematic diagram of splitting one data frame by MEMS solid-state LiDAR into multiple detected data according to an embodiment of this application.

Referring to the schematic diagram shown in FIG. 15, taking the MEMS solid-state LiDAR in the scanning sensor as an example, the MEMS solid-state LiDAR performs scanning through a simple harmonic motion of a scanning mirror, and therefore, a scanning path of the MEMS solid-state LiDAR can implement, for example, a scanning field of view with a reciprocating motion from top to bottom on a slow axis and a reciprocating motion from left to right on a fast axis in a spatial sequence. Therefore, the detection range of the MEMS solid-state LiDAR is divided based on an angle of view corresponding to the slow axis. If a vertical angle of view corresponding to the slow axis of the MEMS solid-state LiDAR is from −12.5° to 12.5°, assuming that N is equal to 5, one piece of detected data is formed each time the MEMS solid-state LiDAR scans 5° on the slow axis. That is, detected data 1501, 1502, 1503, 1504, and 1505 in the figure each are 5°.

Figure 16A:
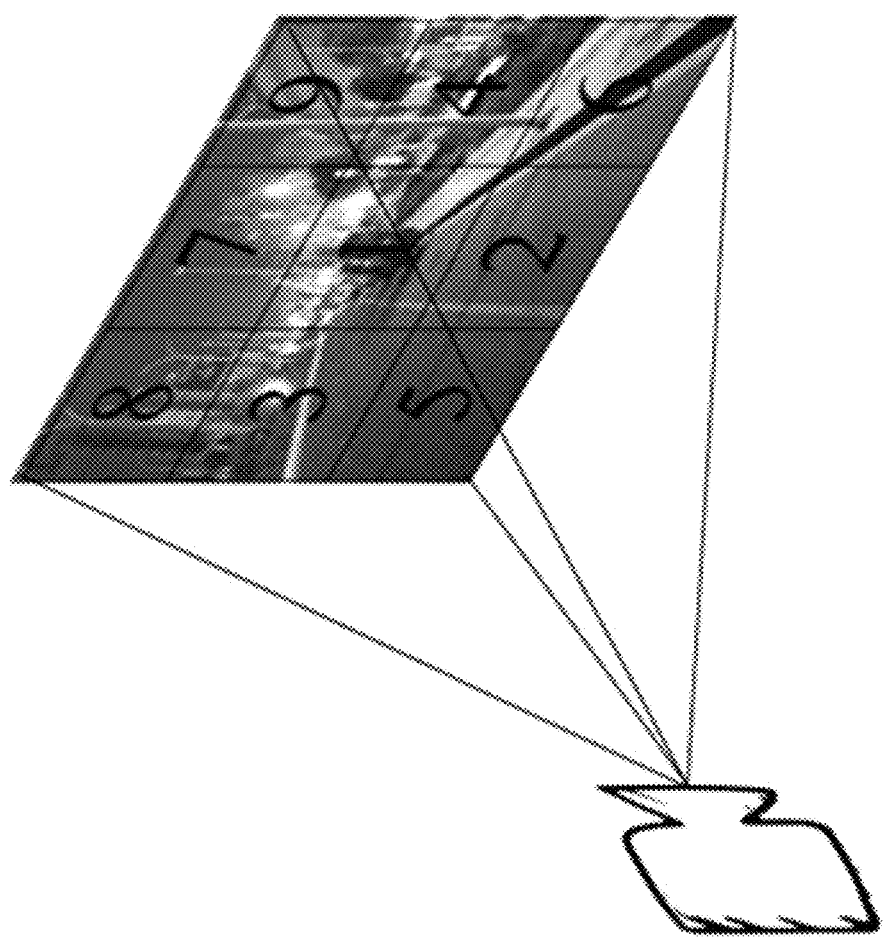
FIG. 16A is a schematic diagram of splitting one data frame by a camera into multiple detected data according to an embodiment of this application.
Figure 16B:
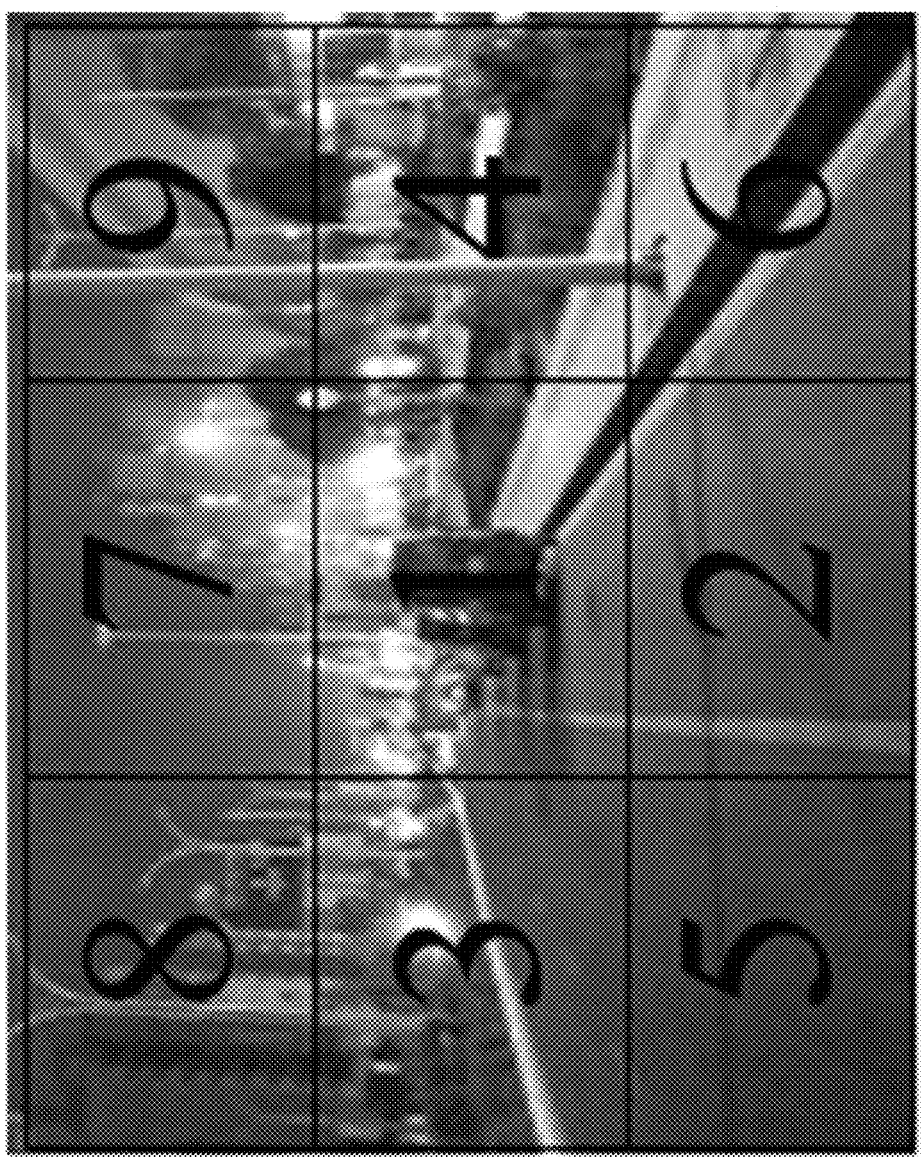
FIG. 16B is another schematic diagram of splitting one data frame by a camera into multiple detected data according to an embodiment of this application.

Referring to schematic diagrams shown in FIG. 16A and FIG. 16B, taking the camera in the non-scanning sensor as an example, the camera collects point cloud data at synchronized time, and therefore, one data frame collected by the camera is usually divided based on the spatial region, and a dividing method can be performed based on importance of the spatial region. As shown in FIG. 16A, one obtained data frame can be divided based on importance of the spatial region in the point cloud data collected by the camera, to obtain a schematic diagram of a correspondence between divided detected data and a spatial position in the figure shown in FIG. 16B. The importance of the spatial region can be determined based on a driving direction of the vehicle. For example, a region at a center directly in front of the vehicle during driving can be ranked first in priorities of spatial regions, and a priority sequence of another spatial region is determined with reference to the driving direction of the vehicle. Taking the point cloud data obtained by the camera shown in FIG. 16B as an example, if the vehicle is currently driving straight ahead on the road, detected data of the central field of view of the vehicle can have a first priority of a spatial region, then detected data of a region below the central field of view can have a second priority of a spatial region, and then detected data of left and right regions in the field of view can have third and fourth priorities of spatial regions. In the foregoing dividing method, the data frame collected by the camera can be divided into 9 pieces of detected data, and priority sequences of spatial regions of the detected data are sequences corresponding to numbers in the figure. It should be noted that, in this embodiment of this application, an amount of detected data obtained by dividing the point cloud data collected by the camera is not limited in this application, and when the point cloud data is divided based on the importance of the spatial region, a priority sequence corresponding to each piece of detected data is not limited to the foregoing importance sequence, and can also include all other proper priority sequences. In addition, when being divided, the data frame collected by the camera may be equally divided into multiple pieces of detected data, or may not be equally divided. This may be specifically correspondingly set with reference to a driving situation of the vehicle. This is not limited in this application.

Optionally, for the scanning sensor, the data frame can also be divided based on time and a spatial region of the data frame scanned by the sensor. When the data frame is divided with reference to the time and space, a dividing method based on the time and space is first determined for each piece of detected data, that is, detection time corresponding to each piece of detected data is determined; and then a priority sequence of the spatial region is determined based on information such as a specific driving direction and driving ambience of the vehicle, and then a final priority sequence of each piece of detected data is determined with reference to the time and space. This embodiment of this application imposes no limitation on a method of dividing one data frame with reference to the time and spatial region.

Further, when being divided, one point cloud data frame can be divided in a customized method or an equal division method. When the point cloud data frame is equally divided, a detection range corresponding to one detected data frame is divided into N equal parts. Taking the LiDAR in the scanning sensor as an example, if time corresponding to a data frame detected by the LiDAR is T, each time the LiDAR runs for time of T/N, point cloud data obtained by the LiDAR through scanning within the time of T/N is obtained. It can be understood that the preset rule can also be arrangement in a gradual descending sequence of time lengths. For example, if an operating cycle of the mechanical LiDAR is 100 ms, when N is 5, operating time corresponding to the 5 detection sub-ranges may be, for example, 30, 25, 20, 15, and 10 in sequence. It can be understood that the preset rule can also be arranging in a gradual ascending sequence of time lengths. For example, if an operating cycle of the mechanical LiDAR is 100 ms, when N is 5, operating time corresponding to the 5 detection sub-ranges may be, for example, 10, 15, 20, 25, and 30 in sequence. Taking a camera of the non-scanning sensor as an example, one data frame collected by the camera may or may not be equally divided. If the data frame obtained by the camera is not equally divided, the data frame can be divided based on importance of a spatial region in the data frame. A setting rule of an importance sequence can be preset by a user. This is not limited in this application.

Further, before storing data information of the detected data and priority information corresponding to the detected data into the cache stack each time one piece of detected data is obtained, the method further includes: obtaining a detection range for each piece of detected data; and determining the priority information corresponding to each piece of detected data based on a position relationship between the detection range corresponding to each piece of detected data and a preset target detection range.

Further, before determining the priority information corresponding to each piece of detected data based on a position relationship between the detection range corresponding to each piece of detected data and a target detection range, the method further includes:

determining a common detection range and a target detection range within the detection range of the sensor, where the target detection range is a key detection region preset by a user, where determining the priority information corresponding to each piece of detected data based on a position relationship between the detection range of each piece of detected data and a target detection range includes:

determining whether the detection range of each piece of detected data is within the target detection range; and if the detection range of the detected data is within the target detection range, determining a priority corresponding to the detected data as a first priority; or if the detection range of the detected data is within the common detection range, determining a priority of the detected data as a second priority, based on a distance between the detection range of the detected data and the target detection range, where the first priority is higher than the second priority.

Further, after determining the priority information corresponding to each piece of detected data based on a position relationship between the detection range corresponding to each piece of detected data and a preset target detection range, the method includes:

determining obstacle information corresponding to each piece of detected data; and further dividing priority information of the detected data based on the obstacle information, where the obstacle information corresponding to each piece of detected data includes at least one of the following: number information of the obstacle, movement speed information of the obstacle, and distance information of the obstacle and the sensor.

In a process of determining the priority of the detected data, each piece of detected data corresponds to one detection range, a distance between a detection range corresponding to each piece of detected data and a preset target detection range is obtained, and then a priority of each piece of detected data can be finally determined with reference to obstacle information in each piece of detected data.

It can be understood that a priority of detected data within the preset target detection range is higher than a priority of detected data outside the preset target detection range.

It can be understood that the detected data within the target detection range has a highest priority; and when the detected data is within the common detection range, a priority of the detected data is determined based on a distance between the detection range corresponding to the detected data and the target detection range. That is, the smaller the distance between the detection range corresponding to the detected data and the target detection range is, the higher the priority corresponding to the detected data is; and the greater the distance between the detection range corresponding to the detected data and the preset target detection range is, the lower the priority corresponding to the detected data is.

It can be understood that when the two or more pieces of detected data are within the target detection range or at a same distance from the target detection range, the priority of the detected data is further determined based on the obstacle information in the detected data, where the obstacle information includes at least one of the following: number information of obstacles, movement speed information of the obstacle, and distance information of the obstacle and the sensor.

It can be understood that the greater the number of obstacles included in the detected data is, the higher the priority corresponding to the detected data is; the smaller the distance between the obstacle included in the detected data and the sensor is, the higher the priority corresponding to the detected data is; the greater the movement speed of the obstacle in the detected data is, the higher the priority corresponding to the detected data is.

In an optional embodiment, further determining the priority of the detected data based on the obstacle information further includes: determining weight of each item of the obstacle information based on the scenario, that is, weight of the number information of the obstacles, weight of the distance information indicating a distance between the obstacle and the sensor, and weight of the movement speed information of the obstacle; and determining a final priority based on weight of each piece of data in the obstacle information and a corresponding value thereof.

It can be understood that the movement speed information of the obstacle may be average movement speed information of multiple obstacles, or movement speed information of an obstacle with a largest movement speed in the obstacles.

Optionally, after the sensor obtains M pieces of detected data in the preset priority sequence, a task scheduling system in the sensor monitors a load state of each one of calculation blocks in real time. If multiple calculation blocks in the calculation blocks include no idle calculation block, the task scheduling system stores to-be-processed detected data into the cache stack in the preset priority sequence until it is detected that there is an idle calculation block in the multiple calculation blocks, and then the task scheduling system sequentially schedules K pieces of detected data in the M pieces of detected data to the idle calculation block in the multiple calculation blocks. After the sensor sequentially obtains the M pieces of detected data in the preset priority sequence, if the task scheduling system detects in real time that there is the idle calculation block in the multiple calculation blocks in the calculation blocks, the task scheduling system sequentially schedules the K pieces of detected data in the M pieces of detected data to the idle calculation block. In actual application, if the sensor has sufficient calculation potential, the divided detected data can be directly scheduled to the calculation block. If the sensor has insufficient calculation potential, the detected data can be stored in the cache stack first, and then the detected data is sequentially retrieved from the cache stack in the preset priority sequence and processed.

It can be understood that, before a point cloud data frame detected by the sensor is divided into the M pieces of detected data, ambient information of the sensor can also be obtained, and a scenario in which the sensor is located is determined based on the ambient information; and the amount M of divided detected data is adjusted based on the scenario.

It can be understood that adjusting the amount M of divided detected data based on the scenario includes: determining scenario complexity of a current scenario; judging whether the scenario complexity is greater than a preset threshold; and when the scenario complexity is greater than the preset threshold, adjusting the amount of current detected data from M to P, where a post-adjustment detection range corresponding to detected data is smaller than a pre-adjustment detection range; or when the scenario complexity is less than the preset threshold, adjusting the amount of current detected data from M to Q, where a post-adjustment detection range corresponding to detected data is greater than a pre-adjustment detection range.

It can be understood that the greater the scenario complexity is, the higher the real-time performance requirement for the target detection region is, and the greater the number of divided target detection ranges in the preset rule is.

It can be understood that, in an optional embodiment, the method further includes: obtaining a calculation potential state of the sensor in real time, that is, an idle state of a calculation block available for scheduling; and if the calculation potential state of the sensor reaches a preset condition within a preset time, adjusting the amount of divided point cloud data frames based on the calculation potential state of the sensor. It can be understood that, if the number of an idle calculation block of the sensor reaches a first preset value within preset time, one point cloud data frame is divided into N pieces of detected data, where N>M. If the number of the idle calculation block of the sensor is in the preset range within the preset time, a dividing rule and the amount of divisions are not adjusted for the point cloud data frame. If the amount of data in the cache stack reaches a preset amount within preset time, a dividing rule for one data frame is adjusted. That is, the data frame is divided into W pieces of detected data, where W<M.

It can be understood that when the idle calculation block of the sensor reaches the first preset value within the preset time, that is, when the sensor has sufficient calculation potential, point cloud data of a region of a higher priority can be further divided first, and a detection range of each post-adjustment detection sub-region in the target detection region is smaller than a detection range of each pre-adjustment sub-detection region, thereby further improving detection real-time performance of the target detection region.

S1303. Integrate sensing calculation results of the K pieces of detected data in real time based on a boundary relationship between detection ranges of the K pieces of detected data, and output a sensing result.

Specifically, after processing the K pieces of detected data, the sensor sends each piece of processed detected data to a block integration module, and in the block integration module, boundary integration processing is performed on current processed detected data and previous detected data on which boundary integration processing has been performed, to output an integration processing result.

Further, after the completion of processing first detected data in the preset sequence, the sensor sends the first detected data to the block integration module, and a calculation block processes multiple pieces of detected data following the first detected data in the preset sequence. After second detected data is completely processed, the task scheduling system sends the second detected data to the block integration module, and the block integration module performs boundary integration processing on the first detected data and the second detected data, and immediately outputs a processing result after finishing integration processing. One of methods for performing boundary integration processing may include: performing, through Intersection over Union (Intersection over Union, IoU), integration processing on a bounding box of adjacent detected data sent to the block integration module. It should be noted that this application imposes no limitation on the method for performing boundary integration processing, and another proper boundary integration method may also be used.

Specifically, before integrating the sensing calculation results of the K pieces of detected data in real time based on the boundary relationship between the detection ranges of the K pieces of detected data, the method further includes: determining whether there is an object at a boundary of the detected data, and if there is no object at the boundary of the detected data, outputting a detection result according to a preset rule. If there is an object at the boundary of the detected data, the detected data is input into the block integration module, and boundary integration is performed on two pieces of detected data in the block integration module based on a position of the object in the detected data and a boundary relationship between the detected data and other detected data. Then an identification result is output.

Specifically, outputting the detection result in the preset rule if there is no object at the boundary of the detected data including: if there is no object at the boundary of the detected data, inputting the detected data into the block integration module, and after other detected data is integrated, outputting all identification results. Optionally, if there is no object at the boundary of the detected data, the detection result of the detected data may be first output, and after an integration result of other detected data is output, detection results of the entire data frame are integrated.

The following further describes improvement of the real-time performance of sensing calculation in the foregoing data processing method with reference to specific instances.

Taking 360° mechanical rotary LiDAR with 64 laser lines as an example, working frequency of the LiDAR is 10 Hz. That is, it takes 100 ms to scan one data frame in this application. For calculation resources of the LiDAR, two graphics cards A and B may be selected. The graphics card A has sufficient calculation potential, such as an NVIDIA RTX 2080Ti graphics card, and the graphics card B is an ordinary graphics card with weaker calculation potential.

If processing logic of a non-optimized processing method in the prior art is used, it takes 60 ms for the graphics card A to process one data frame, and maximum sensing delay is time (100 ms) for scanning one data frame plus time (60 ms) for processing one data frame. That is, maximum sensing delay time of processing one data frame by the graphics card A is 160 ms. For the graphics card B, it takes 120 ms for the graphics card B to process one data frame, and maximum sensing delay is time (100 ms) for scanning one data frame plus time (120 ms) for processing one data frame. That is, maximum sensing delay time of processing one data frame by the graphics card B is 220 ms.

If the data processing method provided in this application is used, to simplify calculation, it is assumed that time for performing boundary integration on the detected data by the boundary integration module remains 10 ms, and time for processing the detected data by the calculation resource is directly proportional to the mount of detected data. For the graphics card A, because the graphics card A has sufficient calculation potential, no data cache is needed, and real-time performance of the sensing calculation of the graphics card A depends on granularity of dividing one data frame by the sensor. Assuming that M is equal to 5, that is, one data frame is divided into 5 pieces of detected data, the sensing delay time of the graphics card A includes a sum of scanning time, sensing calculation time, and integration processing time. Time for scanning one piece of detected data is 100 ms/5, that is, 20 ms; the sensing calculation time is 60 ms/5, that is, 12 ms; the integration processing time is 10 ms; and therefore, for the graphics card A, maximum final sensing delay time is 12 ms+12 ms+10 ms, which is equal to 42 ms. For the graphics card B, because the graphics card B has insufficient potential, after one data frame obtained by the sensor is divided, the divided detected data is immediately output to the cache, and then corresponding detected data is sequentially obtained from the cache in the preset priority sequence and processed. Assuming that M is equal to 6, that is, one data frame is divided into 6 pieces of detected data, the sensing calculation delay time of the graphics card B also includes scanning time, sensing calculation time, and integration processing time. Time for scanning one piece of detected data is 100 ms/6, which is approximately 17 ms; the sensing calculation time is 120 ms/6, which is equal to 20 ms; the integration processing time is 10 ms; and therefore, for the graphics card B, maximum final sensing calculation delay time is 17 ms+20 ms+10 ms, which is equal to 47 ms. Obviously, compared with the non-optimized sensing calculation method used in the prior art, the sensing calculation delay of the graphics card A is changed from initially 160 ms to 42 ms in this solution, and the sensing calculation delay of the graphics card B is changed from initially 220 ms to 47 ms in this solution, time of sensing calculation delay of the graphics card A and the graphics card B is significantly shortened. That is, in the data processing method in this solution, real-time performance of sensing calculation is significantly improved.

In the data processing method provided in this application, one data frame obtained by the sensor is divided into multiple pieces of detected data, and the detected data is calculated in real time and subjected to boundary integration processing. After processing is completed, a result is output immediately without a wait for other detected data. In the data processing method in this application, the detected data is obtained in real time and subjected to calculation and integration processing in real time, to accelerate a sensing calculation process, thereby improving the real-time performance of performing sensing calculation on data by the sensor.

Figure 17:
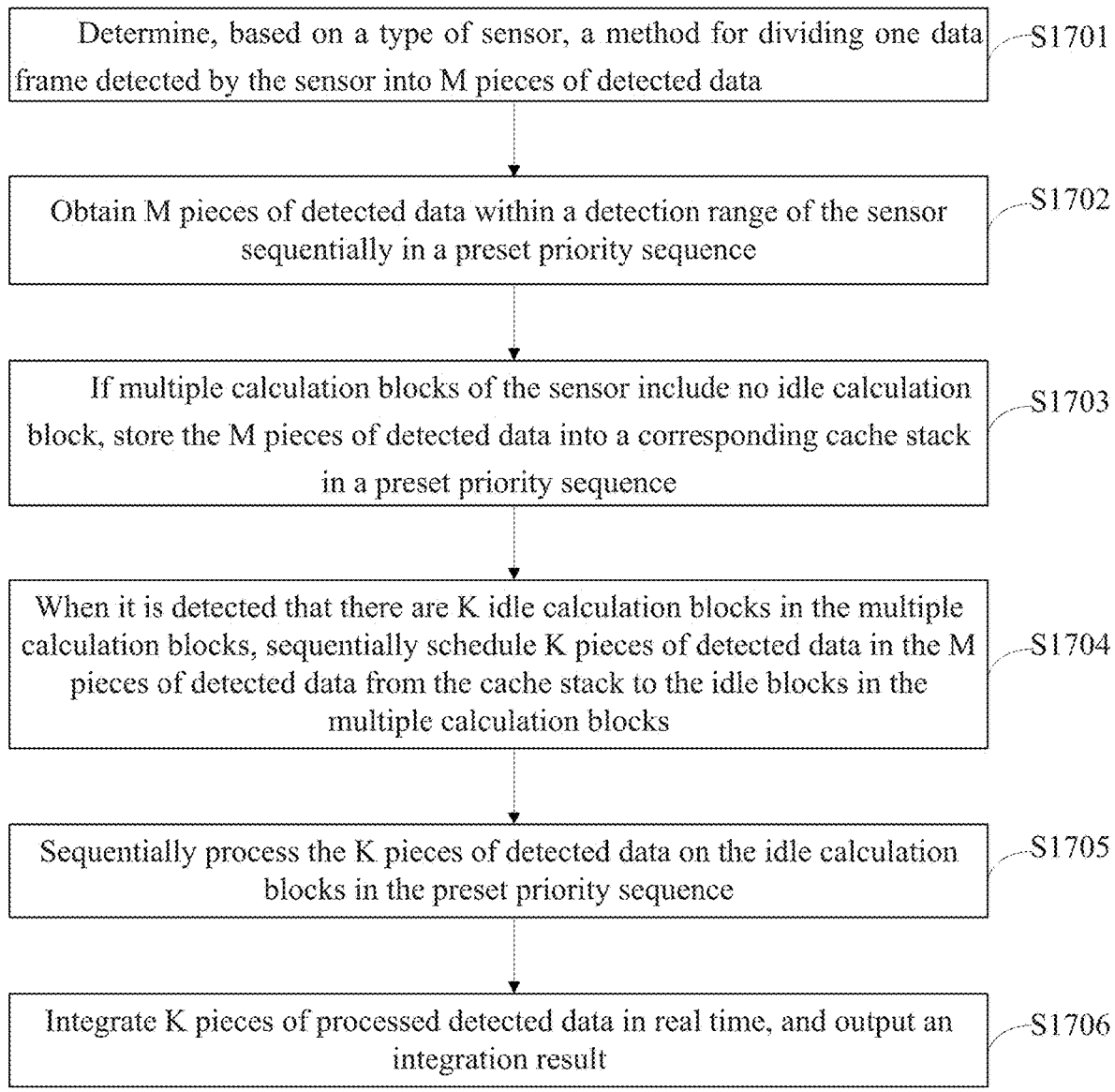
FIG. 17 is a schematic flowchart of a data processing method for a scanning sensor according to an embodiment of this application.

Referring to FIG. 17, FIG. 17 is a schematic flowchart of a data processing method for a scanning sensor according to an embodiment of this application. The method includes:

S1701. Determine, based on a type of sensor, a method for dividing one data frame detected by the sensor into M pieces of detected data.

Specifically, for a scanning sensor, such as LiDAR, including MEMS solid-state LiDAR, rotary mechanical LiDAR, and the like, the method for dividing one data frame detected by the sensor into M pieces of detected data is first determined based on the type of scanning sensor. For example, for the MEMS solid-state LiDAR, one data frame can be divided based on detection time corresponding to one detection cycle of LiDAR. For the rotary mechanical LiDAR, one data frame can be divided based on a detection angle corresponding to the data frame detected by the LiDAR. For detailed descriptions of the MEMS solid-state LiDAR and the rotary mechanical LiDAR, refer to the foregoing embodiments. For the method of dividing detected data by different types of scanning LiDARs, also refer to the foregoing embodiments. Details are not described in this embodiment again.

S1702. Obtain M pieces of detected data within a detection range of the sensor sequentially in a preset sequence.

Specifically, after determining the method for dividing the detected data, the sensor sequentially obtains the M pieces of detected data within the detection range of the sensor sequentially in the preset sequence in the dividing method. One point cloud data frame detected by the sensor within the detection range includes the M pieces of detected data.

If the sensor is a scanning sensor, the preset sequence is a scanning sequence of the sensor. If the sensor is a non-scanning sensor, the preset sequence can be a preset obtaining sequence of detected data.

S1703. If multiple calculation blocks of the sensor include no idle calculation block, store the M pieces of detected data into a corresponding cache stack in a preset priority sequence.

Specifically, a task scheduling system inside the sensor detects in real time whether there is the idle calculation block in the multiple calculation blocks of the sensor. When a specific scanning sensor currently has no idle calculation block, the task scheduling system stores the M pieces of detected data into a corresponding cache stack in a priority sequence of the detected data. In actual application, the lack of the idle calculation block can specifically represent insufficient calculation potential of the sensor, and the presence of idle calculation block can specifically represent sufficient calculation potential of the sensor.

S1704. When it is detected that there are K idle calculation blocks in the multiple calculation blocks, sequentially schedule K pieces of detected data in the M pieces of detected data from the cache stack to the idle blocks in the multiple calculation blocks.

Specifically, when detecting that there are the idle calculation blocks in the multiple calculation blocks and obtaining the number of idle calculation blocks is K, the task scheduling system of the sensor sequentially schedules the K pieces of detected data in the M pieces of detected data from the cache stack to the idle calculation blocks in the multiple calculation blocks.

S1705. Sequentially process the K pieces of detected data on the idle calculation blocks in the preset priority sequence.

Specifically, the sensor sequentially processes the K pieces of detected data on the idle calculation blocks in the preset priority sequence.

S1706. Integrate K pieces of processed detected data in real time, and output an integration result.

Specifically, after processing the K pieces of detected data sequentially, the calculation block of the sensor sends each piece of processed detected data to a block integration module, and in the block integration module, boundary integration processing is performed on current processed detected data and previous detected data on which boundary integration processing has been performed, to output a data processing result. For a boundary integration method, refer to the foregoing embodiments. Details are not described in this embodiment again.

In the data processing method for a scanning sensor provided in this embodiment of this application, the data frame detected by the scanning sensor is divided, the divided detected data is calculated in real time, the divided detected data is integrated in real time after being calculated, and a result is immediately output after the integration processing is completed, thereby improving the real-time performance of performing sensing calculation on data by the scanning sensor.

Figure 18:
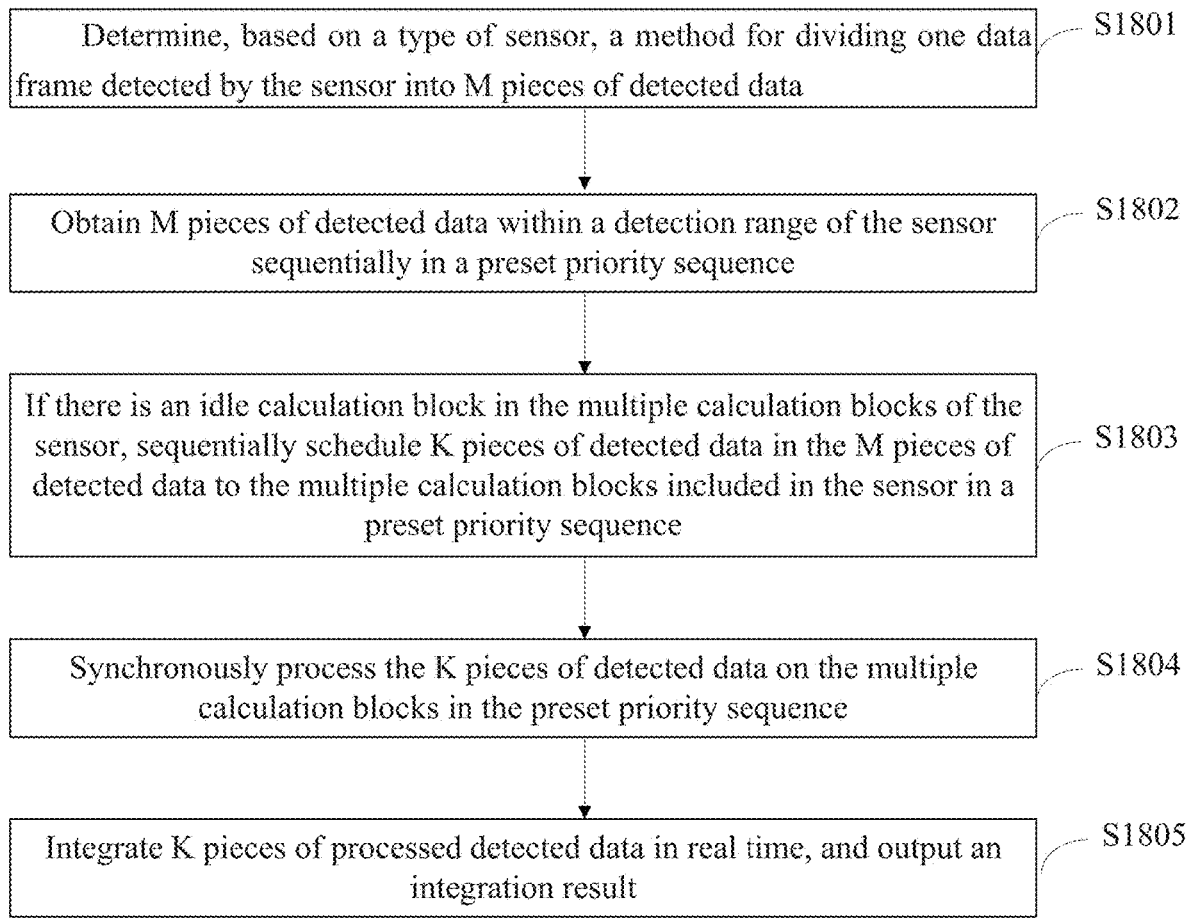
FIG. 18 is a schematic flowchart of a data processing method for a non-scanning sensor according to an embodiment of this application.

Referring to FIG. 18, FIG. 18 is a schematic flowchart of a data processing method for a non-scanning sensor according to an embodiment of this application. The method includes:

S1801. Determine, based on a type of sensor, a method for dividing one data frame detected by the sensor into M pieces of detected data.

Specifically, for the non-scanning sensor, such as a camera, a method for dividing one data frame detected by the camera into multiple pieces of detected data is first determined. For a method of dividing the detected data by the camera, refer to the foregoing embodiments. Details are not described in this embodiment again.

S1802. Obtain M pieces of detected data within a detection range of the sensor sequentially in a preset sequence.

Specifically, after determining the method for dividing the detected data, the sensor sequentially obtains the M pieces of detected data within the detection range of the sensor sequentially in the preset sequence in the dividing method.

S1803. If there is an idle calculation block in the multiple calculation blocks of the sensor, sequentially schedule K pieces of detected data in the M pieces of detected data to the multiple calculation blocks included in the sensor in a preset priority sequence.

Specifically, if there is the idle calculation block in the multiple calculation blocks of the sensor, a task scheduling system in the sensor sequentially schedules each one of K pieces of detected data in a preset priority sequence of the detected data to the multiple calculation blocks included in the sensor.

S1804. Synchronously process the K pieces of detected data on the multiple calculation blocks in the preset priority sequence.

Specifically, the sensor synchronously processes the K pieces of detected data in the M pieces of detected data on the multiple calculation blocks in the preset priority sequence.

S1805. Integrate K pieces of processed detected data in real time, and output an integration result.

Specifically, after processing the K pieces of detected data sequentially, the calculation block of the sensor sends each piece of processed detected data to a block integration module, and in the block integration module, boundary integration processing is performed on current processed detected data and previous detected data on which boundary integration processing has been performed, to output a data processing result. For a boundary integration method, refer to the foregoing embodiments. Details are not described in this embodiment again.

In the data processing method for a non-scanning sensor provided in this embodiment of this application, the data frame detected by the non-scanning sensor is divided into multiple pieces of detected data; and if there are the idle calculation blocks in the multiple calculation blocks, the divided detected data is scheduled to multiple calculation blocks in a preset sequence, the M pieces of detected data are processed synchronously on the multiple calculation blocks under control, the processed detected data is integrated in real time, and an integration result is output immediately after integration is completed, thereby improving the real-time performance of performing sensing calculation on the detected data by the non-scanning sensor.

Figure 19:
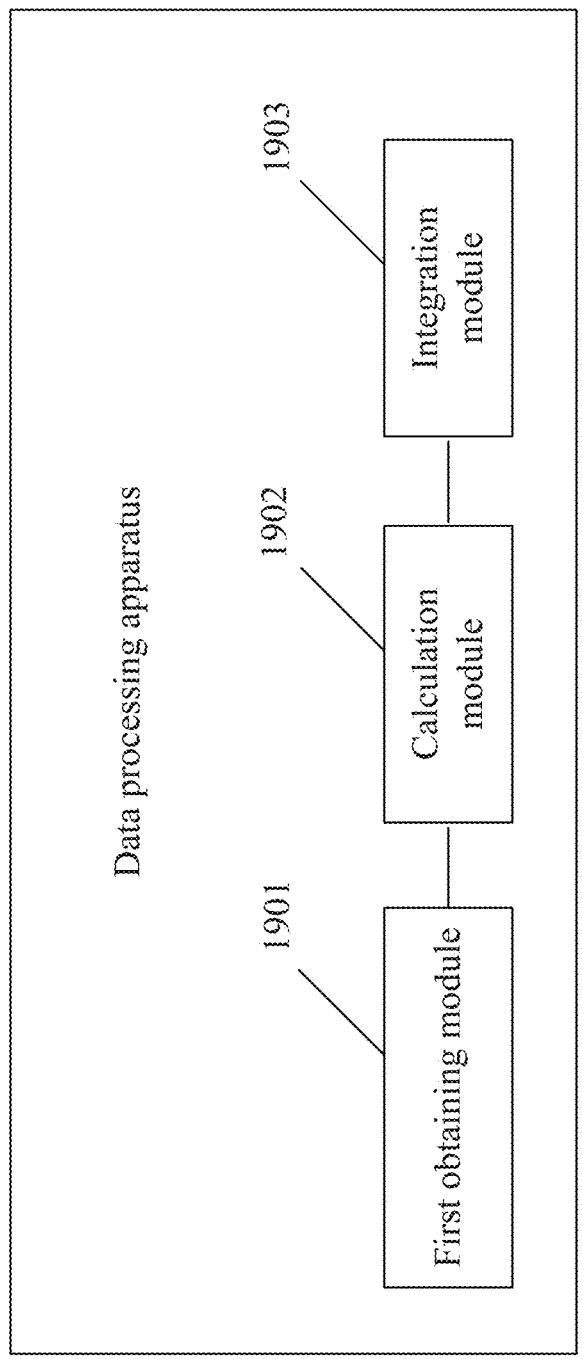
FIG. 19 is a schematic diagram of a data processing apparatus according to an embodiment of this application.

Referring to FIG. 19, FIG. 19 is a schematic diagram of a data processing apparatus according to an embodiment of this application. The apparatus includes:

a first obtaining module 1901, configured to obtain the number K of idle calculation blocks in real time, where K is greater than or equal to 1;

a calculation module 1902, configured to: invoke first K pieces of detected data from a cache stack in a preset priority sequence of detected data, and input the detected data into the idle calculation block for sensing calculation; and an integration module 1903, configured to: integrate sensing calculation results of the K pieces of detected data in real time based on a boundary relationship between detection ranges of the K pieces of detected data, and output a sensing result.

In some embodiments, the apparatus further includes:

a dividing module, configured to: before the calculation module 1902 invokes first K pieces of detected data from a cache stack in a preset priority sequence of detected data, and inputs the detected data into the idle calculation block for sensing calculation, divide one point cloud data frame into M pieces of detected data, where M≥K; and a storage module, configured to store data information of the detected data and priority information corresponding to the detected data into the cache stack each time one piece of detected data is obtained.

In some embodiments, the dividing module is specifically configured to:

determine, based on a type of sensor, a method for dividing the point cloud data frame into the M pieces of detected data, where the dividing method includes at least one of the following: if the sensor is a scanning sensor, performing division based on a detection cycle corresponding to a data frame detected by the scanning sensor, or performing division based on a detection angle corresponding to the data frame detected by the scanning sensor or performing division based on the detection time and a spatial range corresponding to the data frame detected by the scanning sensor; or if the sensor is a non-scanning sensor, performing division based on a spatial region corresponding to the data flame detected by the non-scanning sensor.

In some embodiments, the apparatus further includes:
a second obtaining module, configured to: before the data information of the detected data and the priority information corresponding to the detected data is stored into the cache stack each time one piece of detected data is obtained, obtain a detection range for each piece of detected data; and
a determining module, configured to determine the priority information corresponding to each piece of detected data based on a position relationship between the detection range corresponding to each piece of detected data and a preset target detection range.

In some embodiments, the determining module is further configured to:
before determining the priority information corresponding to each piece of detected data based on a position relationship between the detection range corresponding to each piece of detected data and a target detection range, determine a common detection range and a target detection range within the detection range of the sensor, where the target detection range is a key detection region preset by a user, where
the determining module is further configured to: determine whether the detection range of each piece of detected data is within the target detection range; and if the detection range of the detected data is within the target detection range, determine a priority corresponding to the detected data as a first priority; or if the detection range of the detected data is within the common detection range, determine a priority of the detected data, that is, a second priority, based on a distance between the detection range of the detected data and the target detection range, where the first priority is higher than the second priority.

In some embodiments, the determining module is further configured to:
after determining the priority information corresponding to each piece of detected data based on a position relationship between the detection range corresponding to each piece of detected data and a preset target detection range, determine obstacle information corresponding to each piece of detected data; and
further divide priority information of the detected data based on the obstacle information, where
the obstacle information corresponding to each piece of detected data includes at least one of the following: number information of an obstacle, movement speed information of the obstacle, and distance information of the obstacle and the sensor.

In some embodiments, the integration module 1903 is specifically configured to:
send, to a block integration module in a preset priority sequence, each piece of detected data on which sensing calculation has been performed, and perform, in the block integration module, boundary integration processing on current detected data that has been processed and previous detected data on which boundary integration processing has been performed.

Figure 20:
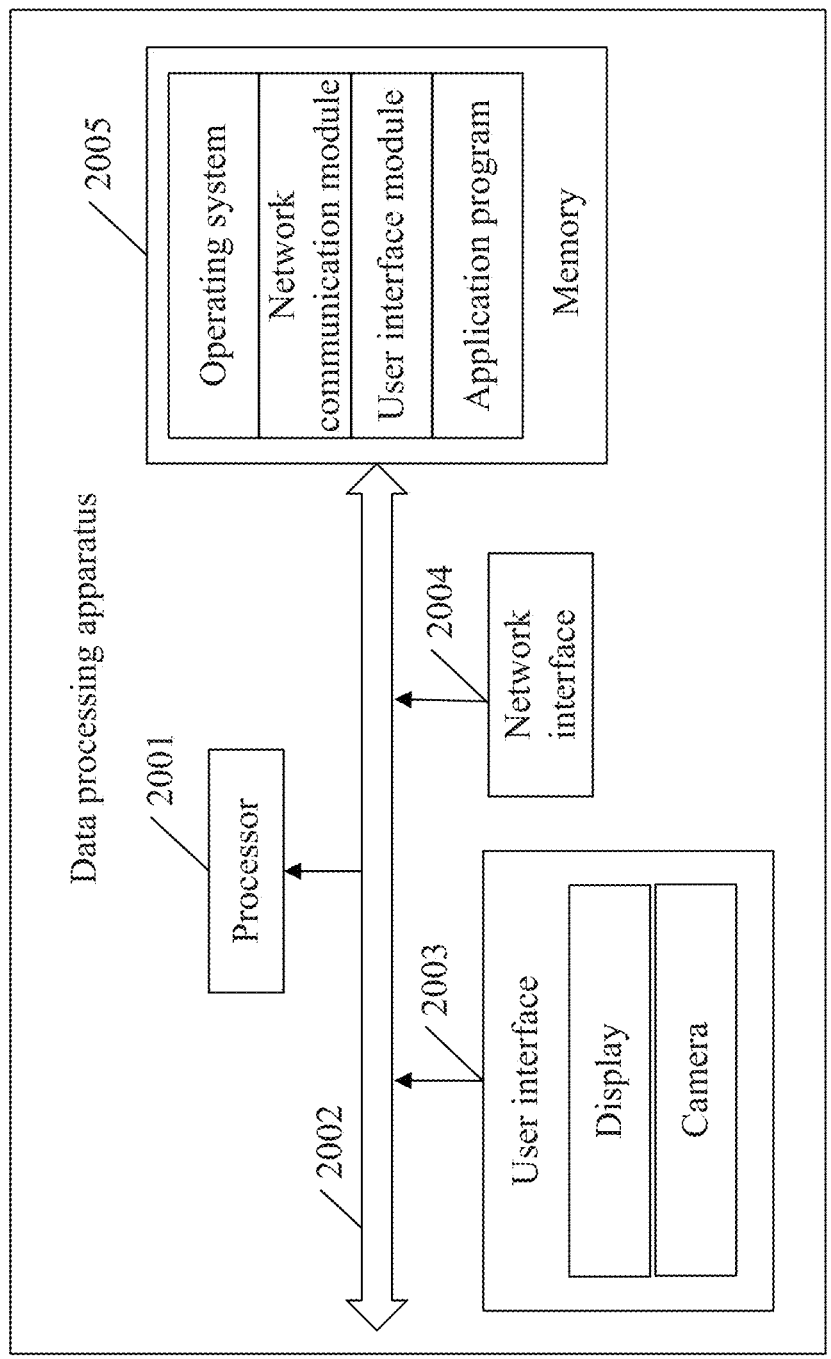
FIG. 20 is a schematic diagram of another data processing apparatus according to an embodiment of this application.

Referring to FIG. 20, FIG. 20 is a schematic structural diagram of another data processing apparatus according to an embodiment of this application. The data processing apparatus may at least include: at least one processor 2001, such as a CPU, at least one network interface 2004, a user interface 2003, a memory 2005, and at least one communications bus 2002. The communications bus 2002 is configured to implement a connection and communication between these components. The user interface 2003 may include, but is not limited to, a camera, a display, a touchscreen, a keyboard, a mouse, and a joystick. Optionally, the network interface 2004 may include a standard wired interface or a wireless interface (for example, a WiFi interface), and a communication connection to a server may be established through the network interface 2004. The memory 2002 may be a high-speed RAM memory, or a non-volatile memory (non-volatile memory), such as at least one magnetic disk memory. As shown in FIG. 10, as a computer storage medium, the memory 2005 may include an operating system, a network communications module, a user interface module, and a program instruction.

It should be noted that the network interface 2004 may be connected to a receiver, a transmitter, or another communications module, and the another communications module may include but is not limited to a WiFi module, or a network communications module of an operator. It can be understood that, in this embodiment of this application, the data processing apparatus may also include the receiver, the transmitter, the another communications module, and the like.

The processor 2001 can be used to invoke the program instruction stored in the memory 1005 to perform the following method:
obtaining the number K of idle calculation blocks in real time, where K is greater than or equal to 1;
invoking first K pieces of detected data from a cache stack in a preset priority sequence of detected data, and inputting the detected data into the idle calculation block for sensing calculation; and
integrating sensing calculation results of the K pieces of detected data in real time based on a boundary relationship between detection ranges of the K pieces of detected data, and outputting a sensing result.

Possibly, before invoking first K pieces of detected data from a cache stack in a preset priority sequence of detected data, and inputting the detected data into the idle calculation block for sensing calculation, the processor 2001 is further configured to:
divide one point cloud data frame into M pieces of detected data, where M≥K; and
store data information of the detected data and priority information corresponding to the detected data into the cache stack each time one piece of detected data is obtained.

Possibly, when dividing one point cloud data frame into M pieces of detected data, the processor 2001 is specifically configured to:
determine, based on a type of sensor, a method for dividing the point cloud data frame into the M pieces of detected data, where the dividing method includes at least one of the following: if the sensor is a scanning sensor, performing division based on a detection cycle corresponding to a point cloud data frame detected by the scanning sensor, or performing division based on a detection range corresponding to the point cloud data frame detected by the scanning sensor or performing division based on the detection time and a spatial region corresponding to the point cloud data frame detected by the scanning sensor; or if the sensor is a non-scanning sensor, performing division based on a spatial region corresponding to the point cloud data frame detected by the non-scanning sensor.

Possibly, before the data information of the detected data and the priority information corresponding to the detected data is stored into the cache stack each time one piece of detected data is obtained, the processor 2001 is further configured to:
- obtain a detection range for each piece of detected data; and
- determine the priority information corresponding to each piece of detected data based on a position relationship between the detection range corresponding to each piece of detected data and a preset target detection range and a preset rule.

Possibly, before determining the priority information corresponding to each piece of detected data based on a position relationship between the detection range corresponding to each piece of detected data and a target detection range, the processor 2001 is further configured to:
- determine a common detection range and a target detection range within the detection range of the sensor, where the target detection range is a key detection region preset by a user, where
- determining the priority information corresponding to each piece of detected data based on a position relationship between the detection range of each piece of detected data and a target detection range includes:
- determining whether the detection range of each piece of detected data is within the target detection range; and if the detection range of the detected data is within the target detection range, determining a priority corresponding to the detected data as a first priority; or if the detection range of the detected data is within the common detection range, determining a priority of the detected data, that is, a second priority, based on a distance between the detection range of the detected data and the target detection range, where the first priority is higher than the second priority.

Possibly, after the processor 2001 determines the priority information corresponding to each piece of detected data based on a position relationship between the detection range corresponding to each piece of detected data and a preset target detection range, the processor 2001 is further configured to:
- determine obstacle information corresponding to each piece of detected data; and further divide priority information of the detected data based on the obstacle information, where
- the obstacle information corresponding to each piece of detected data includes at least one of the following: number information of an obstacle, movement speed information of the obstacle, and distance information of the obstacle and the sensor.

Possibly, when integrating sensing calculation results of the K pieces of detected data in real time based on a boundary relationship between detection ranges of the K pieces of detected data, and outputting a sensing result, the processor 2001 is specifically configured to:
- send, to a block integration module in a preset priority sequence, each piece of detected data on which sensing calculation has been performed, and perform, in the block integration module, boundary integration processing on current detected data that has been processed and previous detected data on which boundary integration processing has been performed.

An embodiment of this application further provides a computer-readable storage medium, where the computer-readable storage medium stores an instruction, and when running on the computer or the processor, the instruction enables the computer or the processor to perform one or more steps in any one of the foregoing methods. If each component module in the foregoing apparatus is implemented in a form of a software functional unit and sold or used as an independent product, the component module can be stored in the computer-readable storage medium.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or the functions according to the embodiments of this application are all or partially generated. The computer may be a general-purpose computer, a special-purpose computer, a computer network, or other programmable apparatuses. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (Digital Video Disc, DVD), a semiconductor medium (for example, a solid state disk (solid state disk, SSD)), or the like.

A person of ordinary skill in the art may understand that all or some of the processes of the methods in the embodiments may be implemented by a computer program instructing relevant hardware. The program may be stored in a computer readable storage medium. When the program is executed, the processes of the methods in the embodiments are performed. The foregoing storage medium includes: various media that can store program code, such as a read-only memory (Read-Only Memory, ROM), a random access memory (Random Access Memory, RAM), a magnetic disk, or an optical disc. In absence of conflicts, the embodiments and features in the embodiments may be randomly combined.

The foregoing described embodiments are only preferred embodiments of this application, and are not intended to limit the scope of this application. Without departing from design spirit of this application, various transformations and improvements made by a person of ordinary skill in the art to the technical solutions of this application shall fall within the protection scope defined in claims of this application.

What is claimed is:

1. A data processing method, comprising:
   - obtaining, by one of a MEMS solid-state LiDAR, a mechanical LiDAR, or a camera, detected data of an obstacle;
   - storing, by a memory, the detected data of the obstacle;
   - obtaining, by a processor, K idle calculation blocks in real time, wherein K is greater than or equal to 1;
   - invoking, by the processor, first K pieces of detected data from a cache stack in a preset priority sequence of detected data, and inputting the detected data into the K idle calculation blocks;
   - sequentially processing, by the processor, K pieces of detected data on the K idle calculation blocks in the preset priority sequence, wherein each piece of detected data is corresponding to one detection range, a distance between a detection range corresponding to each piece of detected data and a preset target detection range is obtained, and a priority of each piece of detected data is determined with reference to obstacle information in each piece of detected data, to obtain the preset priority sequence; the obstacle information corresponding to each piece of detected data includes at least one of the following: number information of the obstacle, movement speed information of the obstacle, and distance information of the obstacle and the sensor; and integrating, by the processor, sensing calculation results of the K pieces of detected data in real time based on a boundary relationship between detection ranges of the K pieces of detected data, and outputting a sensing result which comprises displaying, on a display, the sensing result; thereby ensuring real-time performance of obstacle detection;

wherein before invoking, by the processor, first K pieces of detected data, scanned by a sensor, from a cache stack in a preset priority sequence of detected data, and inputting the detected data into the K idle calculation blocks for sensing calculation, the method further comprises:

dividing, by the processor, into M pieces of detected data, one point cloud data frame obtained by a sensor, wherein M≥K; and storing, by the processor, data information of the detected data and priority information corresponding to the detected data into the cache stack each time one piece of detected data is obtained by a sensor.

2. The data processing method according to claim 1, wherein dividing, by the processor, into M pieces of detected data, one point cloud data frame obtained by the sensor comprises:

determining, based on a type of sensor, a method for dividing the point cloud data frame into the M pieces of detected data, wherein the method for dividing comprises at least one of the following:

if the sensor is a scanning sensor, performing division based on a detection cycle corresponding to a point cloud data frame detected by the scanning sensor, or performing division based on a detection range corresponding to a point cloud data frame detected by the scanning sensor; or if the sensor is a non-scanning sensor, performing division based on a spatial region corresponding to a point cloud data frame detected by the non-scanning sensor.

3. The data processing method according to claim 1, wherein before storing, by the processor, data information of the detected data and priority information corresponding to the detected data into the cache stack each time one piece of detected data is obtained, the data processing method further comprises:

obtaining, by the processor, a detection range for each piece of detected data; and determining, by the processor, the priority information corresponding to each piece of detected data based on a position relationship between the detection range corresponding to each piece of detected data and a preset target detection range.

4. The data processing method according to claim 3, wherein before determining, by the processor, the priority information corresponding to each piece of detected data based on a position relationship between the detection range corresponding to each piece of detected data and a target detection range, the data processing method further comprises:

determining a common detection range and a target detection range within the detection range of the sensor, wherein the target detection range is a key detection region preset by a user, wherein determining the priority information corresponding to each piece of detected data based on a position relationship between the detection range of each piece of detected data and a target detection range comprises: determining whether the detection range of each piece of detected data is within the target detection range; and if the detection range of the detected data is within the target detection range, determining a priority corresponding to the detected data as a first priority; or if the detection range of the detected data is within the common detection range, determining a priority of the detected data, that is, a second priority, based on a distance between the detection range of the detected data and the target detection range, wherein the first priority is higher than the second priority.

5. The data processing method according to claim 3, wherein after determining, by the processor, the priority information corresponding to each piece of detected data based on a position relationship between the detection range corresponding to each piece of detected data and a preset target detection range, the data processing method comprises:

determining, by the processor, obstacle information corresponding to each piece of detected data obtained by the sensor; and further dividing, by the processor, priority information of the detected data based on the obstacle information, wherein the obstacle information corresponding to each piece of detected data comprises at least one of the following: number information of an obstacle, movement speed information of the obstacle, and distance information of the obstacle and the sensor.

6. The data processing method according to claim 1, wherein integrating, by the processor, sensing calculation results of the K pieces of detected data in real time based on a boundary relationship between detection ranges of the K pieces of detected data, and outputting a sensing result comprises:

sending, to a block integration module of the processor in a preset priority sequence, each piece of detected data on which sensing calculation has been performed; and performing, in the block integration module of the processor, boundary integration processing on current detected data that has been processed and previous detected data on which boundary integration processing has been performed.

7. A data processing apparatus, comprising:

a MEMS solid-state LiDAR, a mechanical LiDAR, or a camera, configured to obtain detected data of an obstacle;

a storage module, configured to store the detected data of the obstacle;

a first obtaining module, configured to obtain K idle calculation blocks in real time, wherein K is greater than or equal to 1;

a calculation module, configured to: invoke first K pieces of detected data from a cache stack in a preset priority sequence of detected data, input the detected data into the K idle calculation blocks, and sequentially process K pieces of detected data on the K idle calculation blocks in the preset priority sequence, wherein each piece of detected data is corresponding to one detection range, a distance between a detection range corresponding to each piece of detected data and a preset target detection range is obtained, and a priority of each piece of detected data is determined with reference to obstacle information in each piece of detected data, to obtain the preset priority sequence; the obstacle information corresponding to each piece of detected data includes at least one of the following: number information of the obstacle, movement speed information of the obstacle, and distance information of the obstacle and the sensor;

an integration module, configured to: integrate sensing calculation results of the K pieces of detected data in real time based on a boundary relationship between detection ranges of the K pieces of detected data, and output a sensing result which comprises displaying, on a display, the sensing result; thereby ensuring real-time performance of obstacle detection;

a dividing module, configured to: before the calculation module invokes first K pieces of detected data from a cache stack in a preset priority sequence of detected data, and inputs the detected data into the K idle calculation blocks for sensing calculation, divide, into M pieces of detected data, one point cloud data frame obtained by a sensor, wherein M≥K; and the storage module, configured to store data information of the detected data and priority information corresponding to the detected data into the cache stack each time one piece of detected data is obtained.

8. A data processing apparatus, comprising a processor, a memory, and a communications interface, wherein the processor is connected to the memory and the communications interface; the memory is configured to store executable program code; and the processor reads the executable program code stored in the memory to run a program corresponding to the executable program code, to perform the data processing method according to claim 1.

9. A non-transitory computer-readable storage medium, storing a computer program, wherein when the computer program is executed by a processor, the data processing method according to claim 1 is implemented.

* * * * *